(12) United States Patent
Koo et al.

(10) Patent No.: US 12,445,477 B2
(45) Date of Patent: Oct. 14, 2025

(54) APPARATUS FOR INFERRING CYBERATTACK PATH BASED ON ATTENTION, AND APPARATUS AND METHOD FOR TRAINING INTELLIGENT ATTACK PATH PREDICTION MODEL

(71) Applicant: ELECTRONICS AND TELECOMMUNICATIONS RESEARCH INSTITUTE, Daejeon (KR)

(72) Inventors: Ki-Jong Koo, Daejeon (KR); Dae-Sung Moon, Daejeon (KR); Joo-Young Lee, Daejeon (KR); Ik-Kyun Kim, Daejeon (KR); Kyung-Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 338 days.

(21) Appl. No.: 17/882,090

(22) Filed: Aug. 5, 2022

(65) Prior Publication Data
US 2023/0047450 A1 Feb. 16, 2023

(30) Foreign Application Priority Data
Aug. 10, 2021 (KR) .................. 10-2021-0104942

(51) Int. Cl.
*H04L 9/40* (2022.01)
*G06N 3/08* (2023.01)

(52) U.S. Cl.
CPC ........... *H04L 63/1433* (2013.01); *G06N 3/08* (2013.01)

(58) Field of Classification Search
CPC .............................. H04L 63/1433; G06N 3/08
See application file for complete search history.

(56) References Cited

U.S. PATENT DOCUMENTS

| | | | |
|---|---|---|---|
| 10,848,515 B1* | 11/2020 | Pokhrel | H04L 63/1433 |
| 11,444,876 B2 | 9/2022 | Found | |
| 2015/0381649 A1* | 12/2015 | Schultz | G06Q 10/0635 726/25 |
| 2016/0226894 A1* | 8/2016 | Lee | H04L 63/1416 |
| 2017/0032130 A1* | 2/2017 | Joseph Durairaj | H04L 63/1416 |
| 2018/0103052 A1* | 4/2018 | Choudhury | H04L 63/20 |
| 2018/0198815 A1* | 7/2018 | Hovor | H04L 63/1433 |
| 2018/0330103 A1* | 11/2018 | Chari | H04L 63/1433 |
| 2019/0052663 A1* | 2/2019 | Lee | H04L 63/20 |
| 2019/0222593 A1 | 7/2019 | Craig et al. | |
| 2019/0268366 A1* | 8/2019 | Zeng | G06N 3/047 |
| 2020/0067962 A1* | 2/2020 | Tan | G06F 16/9027 |
| 2021/0027182 A1* | 1/2021 | Harris | G06N 20/20 |
| 2021/0286873 A1* | 9/2021 | El-Moussa | G06F 21/56 |

(Continued)

FOREIGN PATENT DOCUMENTS

| | | | |
|---|---|---|---|
| KR | 10-2018-0007832 A | | 1/2018 |
| KR | 101814368 B1 | | 1/2018 |

(Continued)

*Primary Examiner* — Darshan I Dhruv
(74) *Attorney, Agent, or Firm* — Rabin & Berdo, P.C.

(57) ABSTRACT

Disclosed herein are an apparatus and method for inferring a cyberattack path based on attention. The apparatus includes memory in which at least one program is recorded and a processor for executing the program. The program generates test data required for generating an intelligent attack graph and generates an attack graph based on an intelligent attack path prediction model.

18 Claims, 36 Drawing Sheets

(56) References Cited

U.S. PATENT DOCUMENTS

| | | | | |
|---|---|---|---|---|
| 2021/0409439 A1* | 12/2021 | Engelberg | ............ | H04L 63/1425 |
| 2022/0014534 A1* | 1/2022 | Basovskiy | .......... | H04L 63/1433 |
| 2022/0124108 A1* | 4/2022 | Gamble | ................ | G06F 16/907 |
| 2022/0131894 A1* | 4/2022 | Hassanzadeh | ...... | H04L 63/1433 |
| 2023/0088676 A1* | 3/2023 | She | ........................ | G06N 3/088 |
| | | | | 706/25 |
| 2023/0171276 A1* | 6/2023 | Bisht | ................... | H04L 63/1441 |
| | | | | 726/23 |

FOREIGN PATENT DOCUMENTS

| | | |
|---|---|---|
| KR | 10-2079687 B1 | 2/2020 |
| KR | 20210074891 A | 6/2021 |
| KR | 1020210086220 A | 7/2021 |

* cited by examiner

| | | | | | |
|---|---|---|---|---|---|
| 1 | TOPOLOGY | 1 | ASSET STATE INFORMATION | 1 | ATTACK PATH (LABELED) |
| | | 2 | ASSET STATE INFORMATION | ... | ATTACK PATH (LABELED) |
| | | ... | ASSET STATE INFORMATION | M | ATTACK PATH (LABELED) |
| | | K | ASSET STATE INFORMATION | | |
| ... | | | | | |
| N | TOPOLOGY | 1 | ASSET STATE INFORMATION | 1 | ATTACK PATH (LABELED) |
| | | 2 | ASSET STATE INFORMATION | ... | ATTACK PATH (LABELED) |
| | | ... | ASSET STATE INFORMATION | M | ATTACK PATH (LABELED) |
| | | K | ASSET STATE INFORMATION | | |

FIG. 6

[TOPOLOGY TABLE]

| Topology_ID | Num_hosts | Num_type_OS | Num_type_service | List_hosts | Connectivity_matrix |
|---|---|---|---|---|---|
| t_00000 | 22 | 20 | 32 | ['192.168.10.2', '192.168.10.3', '192.168.10.4, 192.1... | [0, 1, 1, 0, 0, 0, 0, 0, 0, 0, 0, 0, 0, 0, 0, 0, 0, 0, 0, 1, 0, 1, 0, 1, 0, 0, 0. |
| t_00001 | 22 | 20 | 39 | ['192.168.10.2', '192.168.10.3', '192.168.10.4, 192.1... | [0, 1, 1, 1, 0, 0, 0, 0, 0, 0, 0, 0, 0, 0, 0, 0, 0, 0, 0, 1, 0, 1, 0, 1, 1, 1, 0. |
| t_00002 | 22 | 20 | 44 | ['192.168.10.2', '192.168.10.3', '192.168.10.4, 192.1... | [0, 1, 1, 0, 0, 0, 0, 0, 0, 0, 0, 0, 0, 0, 0, 0, 0, 0, 0, 1, 0, 1, 0, 1, 0, 0, 0. |
| t_00003 | 23 | 20 | 42 | ['192.168.10.2', '192.168.10.3', '192.168.10.4, 192.1... | [0, 1, 1, 0, 0, 0, 0, 0, 0, 0, 0, 0, 0, 0, 0, 0, 0, 0, 0, 1, 0, 1, 0, 1, 0, 0, 0. |
| t_00004 | 22 | 20 | 47 | ['192.168.10.2', '192.168.10.3', '192.168.10.4, 192.1... | [0, 1, 1, 0, 0, 0, 0, 0, 0, 0, 0, 0, 0, 0, 0, 0, 0, 0, 0, 1, 0, 1, 0, 1, 0, 0, 0. |
| t_00005 | 22 | 20 | 42 | ['192.168.10.2', '192.168.10.3', '192.168.10.4, 192.1... | [0, 1, 1, 0, 0, 0, 0, 0, 0, 0, 0, 0, 0, 0, 0, 0, 0, 0, 0, 1, 0, 1, 0, 1, 1, 1, 0. |

FIG. 8

```
[ '192. 168. 10. 2',
  '192. 168. 10. 3',
  '192. 168. 10. 4',
  '192. 168. 20. 2',
  '192. 168. 20. 3',
  '192. 168. 20. 4',
  '192. 168. 30. 2',
  '192. 168. 30. 3',
  '192. 168. 30. 4',
  '192. 168. 40. 2',
  '192. 168. 40. 3',
  '192. 168. 40. 4',
  '192. 168. 50. 2',
  '192. 168. 50. 3',
  '192. 168. 50. 4',
  '192. 168. 60. 2',
  '192. 168. 60. 3',
  '192. 168. 60. 4',
  '192. 168. 60. 5',
  '192. 168. 60. 6',
  'router_name_R_0',
  'router_name_R_1' ]
```

| 1 | topology_matrix[0] |

[ [ [ '192. 168. 10. 2',
'192. 168. 10. 3',
'192. 168. 10. 4',
'192. 168. 20. 2',       [HOST IP LIST]
'192. 168. 20. 3',
'192. 168. 20. 4',
'192. 168. 30. 2',
'192. 168. 30. 3',
'192. 168. 30. 4',
'192. 168. 40. 2',
'192. 168. 40. 3',
'192. 168. 40. 4',
'192. 168. 50. 2',
'192. 168. 50. 3',
'192. 168. 50. 4',
'192. 168. 60. 2',
'192. 168. 60. 3',
'192. 168. 60. 4',
'192. 168. 60. 5',
'192. 168. 60. 6',
'router_name_R_0',
'router_name_R_1' ],                [Connectivtiy_matrix]
array([ [ [0, 1, 1, 0, 0, 0, 0, 0, 0, 0, 0, 0, 0, 0, 0, 0, 0, 0, 0, 0, 1, 0],
[1, 0, 1, 0, 0, 0, 0, 0, 0, 0, 0, 0, 0, 0, 0, 0, 0, 0, 0, 0, 1, 0],
[1, 1, 0, 0, 0, 0, 0, 0, 0, 0, 0, 0, 0, 0, 0, 0, 0, 0, 0, 0, 1, 0],
[0, 0, 0, 0, 1, 1, 0, 0, 0, 0, 0, 0, 0, 0, 0, 0, 0, 0, 0, 0, 1, 0],
[0, 0, 0, 1, 0, 0, 0, 0, 0, 0, 0, 0, 0, 0, 0, 0, 0, 0, 0, 0, 1, 0],
[0, 0, 0, 1, 1, 0, 0, 0, 0, 0, 0, 0, 0, 0, 0, 0, 0, 0, 0, 0, 1, 0],
[0, 0, 0, 0, 0, 0, 0, 1, 1, 0, 0, 0, 0, 0, 0, 0, 0, 0, 0, 0, 1, 0],
[0, 0, 0, 0, 0, 0, 1, 0, 1, 0, 0, 0, 0, 0, 0, 0, 0, 0, 0, 0, 1, 0],
[0, 0, 0, 0, 0, 0, 1, 1, 0, 0, 0, 0, 0, 0, 0, 0, 0, 0, 0, 0, 1, 0],
[0, 0, 0, 0, 0, 0, 0, 0, 0, 1, 1, 0, 0, 0, 0, 0, 0, 0, 0, 0, 0, 1],
[0, 0, 0, 0, 0, 0, 0, 0, 0, 1, 0, 1, 0, 0, 0, 0, 0, 0, 0, 0, 0, 1],
[0, 0, 0, 0, 0, 0, 0, 0, 0, 1, 1, 0, 0, 0, 0, 0, 0, 0, 0, 0, 0, 1],
[0, 0, 0, 0, 0, 0, 0, 0, 0, 0, 0, 0, 0, 1, 1, 0, 0, 0, 0, 0, 0, 1],
[0, 0, 0, 0, 0, 0, 0, 0, 0, 0, 0, 0, 1, 0, 1, 0, 0, 0, 0, 0, 0, 1],
[0, 0, 0, 0, 0, 0, 0, 0, 0, 0, 0, 0, 1, 1, 0, 0, 0, 0, 0, 0, 0, 1],
[0, 0, 0, 0, 0, 0, 0, 0, 0, 0, 0, 0, 0, 0, 0, 1, 1, 1, 1, 0, 0, 1],
[0, 0, 0, 0, 0, 0, 0, 0, 0, 0, 0, 0, 0, 0, 0, 1, 0, 1, 1, 1, 0, 1],
[0, 0, 0, 0, 0, 0, 0, 0, 0, 0, 0, 0, 0, 0, 0, 1, 1, 0, 1, 1, 0, 1],
[0, 0, 0, 0, 0, 0, 0, 0, 0, 0, 0, 0, 0, 0, 0, 1, 1, 1, 0, 1, 0, 1],
[0, 0, 0, 0, 0, 0, 0, 0, 0, 0, 0, 0, 0, 0, 0, 1, 1, 1, 1, 0, 0, 1],
[1, 1, 1, 1, 1, 1, 1, 1, 1, 0, 0, 0, 0, 0, 0, 0, 0, 0, 0, 0, 1, 1],
[0, 0, 0, 0, 0, 0, 0, 0, 0, 1, 1, 1, 1, 1, 1, 1, 1, 1, 1, 1, 1, 1] ] ) ] ]

FIG. 11

| Topology_ID | MACaddr | IPaddr | OS | SERVICE | PROTOCOL | PORT | PRODUCT |
|---|---|---|---|---|---|---|---|
| t_00000 | 40:a5:3e:4c:7a:45 | 192.168.10.2 | Windows_server_2016 | HTTPS | tcp | 443 | unified_service_monitor |
| t_00000 | f0:99:ba:57:35:be | 192.168.10.3 | Linux_kernel_4 | HTTPS | tcp | 443 | ozw722_frmware |
| t_00000 | d5:70:fe:51:86:57 | 192.168.10.4 | VxWorks | http | tcp | 81 | sumus |
| t_00000 | a6:ccb6:d0:39:20 | 192.168.20.2 | Mandriva | iso-tsap | tcp | 102 | simatic_s7_1513-1_pn_cpu |
| t_00000 | ea:5a:44:47:c9:5c | 192.168.20.3 | Linux_kernel_2 | dsf | tcp | 555 | etherhaul-5500fd |
| t_00000 | 9f:2e:4e:ec:eb:c0 | 192.168.20.4 | VxWorks | ipmi | tcp | 623 | unified_computing_system_6296up_fa |
| t_00000 | 9f:2e:4e:ec:eb:c0 | 192.168.20.4 | VxWorks | ipmi | tcp | 623 | system_x3550_m2 |
| t_00000 | 33:15:34:33:9b:3c | 192.168.30.2 | Ubuntn_8 | TFTP | tcp | 69 | vision_ax1355cln_megadome_camers |
| t_00000 | 33:15:34:33:9b:3c | 192.168.30.2 | Ubuntn_8 | ipmi | | | sysem_6100xp_fa |
| t_00000 | b0:73:53:34:d3:8 | 192.168.30.3 | Linux_kernel_3 | TFTP | | | ltithreaded |
| t_00000 | b8:89:83:f0:50:34 | 192.168.30.4 | Windows_mobile | HTTPS | | | _1200_frimware |
| t_00001 | a3:72:db:d3:f7:7e | 192.168.40.2 | Mac_OS_X_10.11 | SNMP | | | |

<os_dict>
{Windows_server_2016':67,}

<service_dict>
{'HTTPS':28,}

<port_dict>
{'443':33,}

<product_dict>
{'unified_service_monitor':180,}

FIG. 12

| 1 | seryice_list[0] |
|---|---|

| Topology_ID | Start_node | End_node | PATH | SCORE |
|---|---|---|---|---|
| t_00000 | 192. 168. 60. 2 | 192. 168. 60. 6 | ['192. 168. 60. 2', '192. 168. 60. 6'] | 0.10183292 |
| t_00000 | 192. 168. 60. 4 | 192. 168. 60. 6 | ['192. 168. 60. 4, 192. 168. 60. 6'] | 0.10183292 |
| t_00000 | 192. 168. 60. 6 | 192. 168. 60. 2 | ['192. 168. 60. 6, 192. 168. 60. 2'] | 0.10183292 |
| t_00000 | 192. 168. 60. 6 | 192. 168. 60. 4 | ['192. 168. 60. 6, 192. 168. 60. 4'] | 0.10183292 |
| t_00000 | 192. 168. 40. 2 | 192. 168. 40. 3 | ['192. 168. 40. 2, 192. 168. 40. 3'] | 0.08479498 |
| t_00000 | 192. 168. 40. 3 | 192. 168. 40. 2 | ['192. 168. 40. 3, 192. 168. 40. 2'] | 0.08479498 |
| t_00000 | 192. 168. 60. 2 | 192. 168. 60. 4 | ['192. 168. 60. 2, 192. 168. 60. 4'] | 0.06942089 |
| t_00000 | 192. 168. 60. 4 | 192. 168. 60. 2 | ['192. 168. 60. 4, 192. 168. 60. 2'] | 0.06942089 |
| t_00000 | 192. 168. 40. 3 | 192. 168. 40. 4 | ['192. 168. 40. 3, 192. 168. 40. 4'] | 0.06386957 |
| t_00000 | 192. 168. 40. 4 | 192. 168. 40. 3 | ['192. 168. 40. 4, 192. 168. 40. 3'] | 0.06386957 |
| t_00001 | 192. 168. 20. 3 | 192. 168. 20. 6 | ['192. 168. 20. 3, 192. 168. 20. 6'] | 0.10002728 |
| t_00001 | 192. 168. 20. 6 | 192. 168. 20. 3 | ['192. 168. 20. 6, 192. 168. 20. 3'] | 0.10002728 |

[ [ [ '192. 168. 60. 2', '192. 168. 60. 6' ] ,
[ '192. 168. 60. 4, 192. 168. 60. 6' ] ,
[ '192. 168. 60. 6, 192. 168. 60. 2' ] ,
[ '192. 168. 60. 6, 192. 168. 60. 4' ] ,
[ '192. 168. 40. 2, 192. 168. 40. 3' ] ,
[ '192. 168. 40. 3, 192. 168. 40. 2' ] ,
[ '192. 168. 60. 2, 192. 168. 60. 4' ] ,
[ '192. 168. 60. 4, 192. 168. 60. 2' ] ,
[ '192. 168. 40. 3, 192. 168. 40. 4' ] ,
[ '192. 168. 40. 4, 192. 168. 40. 3' ] ] ,
[ [ '192. 168. 20. 3, 192. 168. 20. 6' ] ,
[ '192. 168. 20. 6, 192. 168. 20. 3' ] ,
[ '192. 168. 20. 4, 192. 168. 20. 6' ] ,
[ '192. 168. 20. 6, 192. 168. 20. 4' ] ,
[ '192. 168. 40. 4, 192. 168. 40. 5' ] ,
[ '192. 168. 40. 5, 192. 168. 40. 4' ] ,
[ '192. 168. 40. 2, 192. 168. 40. 5' ] ,

FIG. 14 array([[67, 28, 180, 33, 0, 0, 0, 0, 0, 0, 0, 0, 0, 0, 11, 28, 16, 33, 0, 0, 0, 0, 0, 0, 0, 0, 0, 0, 50, 13, 82, 14, 0, 0, 0, 0, 0, 0, 0, 0, 0, 0, 24, 1

CONNECTIVITY MATRIX : REPRESENT PHYSICAL CONNECTIVITY

| 1 | topo_mat.shape |
| 2 | topo_mat_upper |

(23, 23)

```
array( [ [0, 1, 1, 0, 0, 0, 0, 0, 0, 0, 0, 0, 0, 0, 0, 0, 0, 0, 0, 0, 1, 0, 0],
         [0, 0, 1, 0, 0, 0, 0, 0, 0, 0, 0, 0, 0, 0, 0, 0, 0, 0, 0, 0, 1, 0, 0],
         [0, 0, 0, 0, 0, 0, 0, 0, 0, 0, 0, 0, 0, 0, 0, 0, 0, 0, 0, 0, 1, 0, 0],
         [0, 0, 0, 0, 1, 1, 0, 0, 0, 0, 0, 0, 0, 0, 0, 0, 0, 0, 0, 0, 1, 0, 0],
         [0, 0, 0, 0, 0, 1, 0, 0, 0, 0, 0, 0, 0, 0, 0, 0, 0, 0, 0, 0, 1, 0, 0],
         [0, 0, 0, 0, 0, 0, 0, 0, 0, 0, 0, 0, 0, 0, 0, 0, 0, 0, 0, 0, 1, 0, 0],
         [0, 0, 0, 0, 0, 0, 0, 1, 1, 0, 0, 0, 0, 0, 0, 0, 0, 0, 0, 0, 1, 0, 0],
         [0, 0, 0, 0, 0, 0, 0, 0, 1, 0, 0, 0, 0, 0, 0, 0, 0, 0, 0, 0, 1, 0, 0],
         [0, 0, 0, 0, 0, 0, 0, 0, 0, 0, 0, 0, 0, 0, 0, 0, 0, 0, 0, 0, 1, 0, 0],
         [0, 0, 0, 0, 0, 0, 0, 0, 0, 1, 1, 0, 0, 0, 0, 0, 0, 0, 0, 0, 0, 1, 0],
         [0, 0, 0, 0, 0, 0, 0, 0, 0, 0, 1, 0, 0, 0, 0, 0, 0, 0, 0, 0, 0, 1, 0],
         [0, 0, 0, 0, 0, 0, 0, 0, 0, 0, 0, 0, 0, 0, 0, 0, 0, 0, 0, 0, 0, 1, 0],
         [0, 0, 0, 0, 0, 0, 0, 0, 0, 0, 0, 0, 1, 1, 0, 0, 0, 0, 0, 0, 0, 1, 0],
         [0, 0, 0, 0, 0, 0, 0, 0, 0, 0, 0, 0, 0, 1, 0, 0, 0, 0, 0, 0, 0, 1, 0],
         [0, 0, 0, 0, 0, 0, 0, 0, 0, 0, 0, 0, 0, 0, 0, 0, 0, 0, 0, 0, 0, 1, 0],
         [0, 0, 0, 0, 0, 0, 0, 0, 0, 0, 0, 0, 0, 0, 0, 1, 1, 1, 1, 0, 1, 0],
         [0, 0, 0, 0, 0, 0, 0, 0, 0, 0, 0, 0, 0, 0, 0, 0, 1, 1, 1, 0, 1, 0],
         [0, 0, 0, 0, 0, 0, 0, 0, 0, 0, 0, 0, 0, 0, 0, 0, 0, 1, 1, 0, 1, 0],
         [0, 0, 0, 0, 0, 0, 0, 0, 0, 0, 0, 0, 0, 0, 0, 0, 0, 0, 1, 0, 1, 0],
         [0, 0, 0, 0, 0, 0, 0, 0, 0, 0, 0, 0, 0, 0, 0, 0, 0, 0, 0, 0, 1, 0],
         [0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0] ] )
```

'1' INDICATES THAT HOST NODES ARE PHYSICALLY CONNECTED TO EACH OTHER

[UPPER TRIANGULAR TOPOLOGY MATRIX]

| 1 | topo_mat.shape |
| 2 | topo_mat_upper |

(23, 23)
array( [ [0, 1, 1, 0, 0, 0, 0, 0, 0, 0, 0, 0, 0, 0, 0, 0, 0, 0, 0, 0, 1, 0, 0],
[0, 0, 1, 0, 0, 0, 0, 0, 0, 0, 0, 0, 0, 0, 0, 0, 0, 0, 0, 0, 1, 0, 0],
[0, 0, 0, 0, 0, 0, 0, 0, 0, 0, 0, 0, 0, 0, 0, 0, 0, 0, 0, 0, 1, 0, 0],
[0, 0, 0, 0, 1, 1, 0, 0, 0, 0, 0, 0, 0, 0, 0, 0, 0, 0, 0, 0, 1, 0, 0],
[0, 0, 0, 0, 0, 1, 0, 0, 0, 0, 0, 0, 0, 0, 0, 0, 0, 0, 0, 0, 1, 0, 0],
[0, 0, 0, 0, 0, 0, 0, 0, 0, 0, 0, 0, 0, 0, 0, 0, 0, 0, 0, 0, 1, 0, 0],
[0, 0, 0, 0, 0, 0, 0, 1, 1, 0, 0, 0, 0, 0, 0, 0, 0, 0, 0, 0, 1, 0, 0],
[0, 0, 0, 0, 0, 0, 0, 0, 1, 0, 0, 0, 0, 0, 0, 0, 0, 0, 0, 0, 1, 0, 0],
[0, 0, 0, 0, 0, 0, 0, 0, 0, 0, 0, 0, 0, 0, 0, 0, 0, 0, 0, 0, 1, 0, 0],
[0, 0, 0, 0, 0, 0, 0, 0, 0, 0, 1, 1, 0, 0, 0, 0, 0, 0, 0, 0, 0, 1, 0],
[0, 0, 0, 0, 0, 0, 0, 0, 0, 0, 0, 0, 0, 0, 0, 0, 0, 0, 0, 0, 1, 0],
[0, 0, 0, 0, 0, 0, 0, 0, 0, 0, 0, 0, 0, 0, 0, 0, 0, 0, 0, 0, 0, 1, 0],
[0, 0, 0, 0, 0, 0, 0, 0, 0, 0, 0, 0, 1, 1, 0, 0, 0, 0, 0, 0, 0, 1, 0],
[0, 0, 0, 0, 0, 0, 0, 0, 0, 0, 0, 0, 0, 1, 0, 0, 0, 0, 0, 0, 0, 1, 0],
[0, 0, 0, 0, 0, 0, 0, 0, 0, 0, 0, 0, 0, 0, 0, 0, 0, 0, 0, 0, 0, 1, 0],
[0, 0, 0, 0, 0, 0, 0, 0, 0, 0, 0, 0, 0, 0, 0, 0, 1, 1, 1, 1, 0, 1, 0],
[0, 0, 0, 0, 0, 0, 0, 0, 0, 0, 0, 0, 0, 0, 0, 0, 0, 1, 1, 1, 0, 1, 0],
[0, 0, 0, 0, 0, 0, 0, 0, 0, 0, 0, 0, 0, 0, 0, 0, 0, 0, 1, 1, 0, 1, 0],
[0, 0, 0, 0, 0, 0, 0, 0, 0, 0, 0, 0, 0, 0, 0, 0, 0, 0, 0, 1, 0, 1, 0],
[0, 0, 0, 0, 0, 0, 0, 0, 0, 0, 0, 0, 0, 0, 0, 0, 0, 0, 0, 0, 0, 1, 0],
[0, 0, 0, 0, 0, 0, 0, 0, 0, 0, 0, 0, 0, 0, 0, 0, 0, 0, 0, 0, 0, 0, 0],
[0, 0, 0, 0, 0, 0, 0, 0, 0, 0, 0, 0, 0, 0, 0, 0, 0, 0, 0, 0, 0, 0, 0],
[0, 0, 0, 0, 0, 0, 0, 0, 0, 0, 0, 0, 0, 0, 0, 0, 0, 0, 0, 0, 0, 0, 0]])

[SPECIFIC MATRIX]
- REPRESENT ATTACK PATH

| 1 | specific_mat | 9 10 11 | 15 16 17 18 19 |

```
array( [ [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
    9    [0, 0, 0, 0, 0, 0, 0, 0, 0, 0, 1, 0, 0, 0, 0, 0, 0, 0, 0, 0, 0],
    10   [0, 0, 0, 0, 0, 0, 0, 0, 0, 1, 0, 1, 0, 0, 0, 0, 0, 0, 0, 0, 0],
    11   [0, 0, 0, 0, 0, 0, 0, 0, 0, 0, 1, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
    15   [0, 0, 0, 0, 0, 0, 0, 0, 0, 0, 0, 0, 0, 0, 0, 0, 1, 0, 1, 0, 0, 0],
    16   [0, 0, 0, 0, 0, 0, 0, 0, 0, 0, 0, 0, 0, 0, 0, 0, 0, 0, 0, 0, 0],
    17   [0, 0, 0, 0, 0, 0, 0, 0, 0, 0, 0, 0, 0, 0, 1, 0, 0, 0, 1, 0, 0, 0],
    18   [0, 0, 0, 0, 0, 0, 0, 0, 0, 0, 0, 0, 0, 0, 1, 0, 1, 0, 0, 0, 0, 0],
    19   [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0] ] )
```

| 21 | attack_graph_neg |

[ [ '192. 168. 10. 4', 'router_name_R_0' ] ,
 [ 'router_name_R_0', 'router_name_R_1' ] ,
 [ '192. 168. 40. 2', 'router_name_R_1' ] ,
 [ '192. 168. 50. 2', '192. 168. 50. 4' ] ,
 [ '192. 168. 60. 3', '192. 168. 60. 5' ] ,
 [ '192. 168. 60. 2', '192. 168. 60. 5' ] ,
 [ '192. 168. 20. 2', '192. 168. 20. 3' ] ,
 [ '192. 168. 60. 5', 'router_name_R_1' ] ,
 [ '192. 168. 30. 3', 'router_name_R_0' ] ,
 [ '192. 168. 10. 3', '192. 168. 10. 4' ] ,
 [ '192. 168. 30. 4', 'router_name_R_0' ] ,
 [ '192. 168. 40. 2', '192. 168. 40. 4' ] ,
 [ '192. 168. 60. 4', 'router_name_R_1' ] ,
 [ '192. 168. 50. 2', 'router_name_R_1' ] ,
 [ '192. 168. 50. 3', 'router_name_R_1' ] ,
 [ '192. 168. 10. 2', 'router_name_R_0' ] ,
 [ '192. 168. 20. 3', '192. 168. 20. 4' ] ,
 [ '192. 168. 60. 2', 'router_name_R_1' ] ,
 [ '192. 168. 50. 3', '192. 168. 50. 4' ] ,
 [ '192. 168. 30. 2', '192. 168. 30. 3' ] ]

FIG. 25

'topo_mat: REPRESENT STATE OF PHYSICAL CONNECTION BETWEEN HOSTS IN CURRENT TOPOLOGY

```
                                                            21
array( [ [0, 1, 1, 0, 0, 0, 0, 0, 0, 0, 0, 0, 0, 0, 0, 0, 0, 0, 0, 0, 1, 0, 0],
         [1, 0, 1, 0, 0, 0, 0, 0, 0, 0, 0, 0, 0, 0, 0, 0, 0, 0, 0, 0, 1, 0, 0],
         [1, 1, 0, 0, 0, 0, 0, 0, 0, 0, 0, 0, 0, 0, 0, 0, 0, 0, 0, 0, 1, 0, 0],
         [0, 0, 0, 0, 1, 1, 0, 0, 0, 0, 0, 0, 0, 0, 0, 0, 0, 0, 0, 0, 1, 0, 0],
         [0, 0, 0, 1, 0, 1, 0, 0, 0, 0, 0, 0, 0, 0, 0, 0, 0, 0, 0, 0, 1, 0, 0],
         [0, 0, 0, 1, 1, 0, 0, 0, 0, 0, 0, 0, 0, 0, 0, 0, 0, 0, 0, 0, 1, 0, 0],
         [0, 0, 0, 0, 0, 0, 0, 1, 1, 0, 0, 0, 0, 0, 0, 0, 0, 0, 0, 0, 1, 0, 0],
         [0, 0, 0, 0, 0, 0, 1, 0, 1, 0, 0, 0, 0, 0, 0, 0, 0, 0, 0, 0, 1, 0, 0],
         [0, 0, 0, 0, 0, 0, 1, 1, 0, 0, 0, 0, 0, 0, 0, 0, 0, 0, 0, 0, 1, 0, 0],
         [0, 0, 0, 0, 0, 0, 0, 0, 0, 0, 1, 0, 0, 0, 0, 0, 0, 0, 0, 0, 0, 1, 0],
   10  [ [0, 0, 0, 0, 0, 0, 0, 0, 1, 0, 1, 0, 0, 0, 0, 0, 0, 0, 0, 0, 0, 1, 0] ,
         [0, 0, 0, 0, 0, 0, 0, 0, 1, 1, 0, 0, 0, 0, 0, 0, 0, 0, 0, 0, 0, 1, 0],
         [0, 0, 0, 0, 0, 0, 0, 0, 0, 0, 0, 0, 1, 1, 0, 0, 0, 0, 0, 0, 0, 1, 0],
         [0, 0, 0, 0, 0, 0, 0, 0, 0, 0, 0, 1, 0, 1, 0, 0, 0, 0, 0, 0, 0, 1, 0],           -55
         [0, 0, 0, 0, 0, 0, 0, 0, 0, 0, 0, 1, 1, 0, 0, 0, 0, 0, 0, 0, 0, 1, 0],
         [0, 0, 0, 0, 0, 0, 0, 0, 0, 0, 0, 0, 0, 0, 1, 1, 1, 0, 1, 0, 1, 0],
         [0, 0, 0, 0, 0, 0, 0, 0, 0, 0, 0, 0, 0, 0, 1, 0, 1, 1, 1, 0, 1, 0],
         [0, 0, 0, 0, 0, 0, 0, 0, 0, 0, 0, 0, 0, 0, 1, 1, 0, 1, 0, 1, 0],                -54
         [0, 0, 0, 0, 0, 0, 0, 0, 0, 0, 0, 0, 0, 1, 1, 1, 0, 1, 0, 1, 0],
         [0, 0, 0, 0, 0, 0, 0, 0, 0, 0, 0, 0, 0, 1, 1, 1, 1, 0, 0, 1, 0],
         [1, 1, 1, 1, 1, 1, 1, 1, 1, 0, 0, 0, 0, 0, 0, 0, 0, 0, 1, 1, 0],
         [0, 0, 0, 0, 0, 0, 0, 0, 1, 1, 1, 1, 1, 1, 1, 1, 1, 1, 1, 1, 0],
         [0, 0, 0, 0, 0, 0, 0, 0, 0, 0, 0, 0, 0, 0, 0, 0, 0, 0, 0, 0] ] )
```

<connectivity>
( [ '192. 168. 60. 2' , '192. 168. 60. 6' ] , 15, 19)
( [ '192. 168. 60. 4' , '192. 168. 60. 6' ] , 17, 19)
( [ '192. 168. 60. 6' , '192. 168. 60. 2' ] , 19, 15)
( [ '192. 168. 60. 6' , '192. 168. 60. 4' ] , 19, 17)
( [ '192. 168. 40. 2' , '192. 168. 40. 3' ] , 9, 10)
( [ '192. 168. 40. 3' , '192. 168. 40. 2' ] , 10, 9)
( [ '192. 168. 60. 2' , '192. 168. 60. 4' ] , 15, 17)
( [ '192. 168. 60. 4' , '192. 168. 60. 2' ] , 17, 15)
( [ '192. 168. 40. 3' , '192. 168. 40. 4' ] , 10, 11)
( [ '192. 168. 40. 4' , '192. 168. 40. 3' ] , 11, 10)

j, idx0_x, idx0_y

FIG. 26

'specific_mat: REPRESENT POSITION IN MATRIX FOR NEGATIVE ATTACK PATH

```
                                                                21
array( [ [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
     10  [0, 0, 0, 0, 0, 0, 0, 0, 0, 0, 0, 0, 0, 0, 0, 0, 0, 0, 0, 0, 0, 1, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],   ~56
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0, 0, 0] ])
```

FIG. 27

'attack_graph[i=0] : '

'topo_mat: REPRESENT STATE OF PHYSICAL CONNECTION BETWEEN HOSTS IN CURRENT TOPOLOGY

```
                                                               19
array( [ [0, 1, 1, 0, 0, 0, 0, 0, 0, 0, 0, 0, 0, 0, 0, 0, 0, 0, 0,[0], 1, 0, 0],
         [1, 0, 1, 0, 0, 0, 0, 0, 0, 0, 0, 0, 0, 0, 0, 0, 0, 0, 0, 0, 1, 0, 0],
         [1, 1, 0, 0, 0, 0, 0, 0, 0, 0, 0, 0, 0, 0, 0, 0, 0, 0, 0, 0, 1, 0, 0],
         [0, 0, 0, 0, 1, 1, 0, 0, 0, 0, 0, 0, 0, 0, 0, 0, 0, 0, 0, 0, 1, 0, 0],
         [0, 0, 0, 1, 0, 1, 0, 0, 0, 0, 0, 0, 0, 0, 0, 0, 0, 0, 0, 0, 1, 0, 0],
         [0, 0, 0, 1, 1, 0, 0, 0, 0, 0, 0, 0, 0, 0, 0, 0, 0, 0, 0, 0, 1, 0, 0],
         [0, 0, 0, 0, 0, 0, 0, 1, 1, 0, 0, 0, 0, 0, 0, 0, 0, 0, 0, 0, 1, 0, 0],
         [0, 0, 0, 0, 0, 0, 1, 0, 1, 0, 0, 0, 0, 0, 0, 0, 0, 0, 0, 0, 1, 0, 0],
         [0, 0, 0, 0, 0, 0, 1, 1, 0, 0, 0, 0, 0, 0, 0, 0, 0, 0, 0, 0, 1, 0, 0],
         [0, 0, 0, 0, 0, 0, 0, 0, 0,(1),1, 0, 0, 0, 0, 0, 0, 0, 0, 0, 0, 1, 0],
         [0, 0, 0, 0, 0, 0, 0, 0, 0, 1, 0,(1),0, 0, 0, 0, 0, 0, 0, 0, 0, 1, 0],
         [0, 0, 0, 0, 0, 0, 0, 0, 0, 1, 1, 0, 0, 0, 0, 0, 0, 0, 0, 0, 0, 1, 0],
         [0, 0, 0, 0, 0, 0, 0, 0, 0, 0, 0, 0, 0, 1, 1, 0, 0, 0, 0, 0, 0, 1, 0],
         [0, 0, 0, 0, 0, 0, 0, 0, 0, 0, 0, 0, 1, 0, 1, 0, 0, 0, 0, 0, 0, 1, 0],
         [0, 0, 0, 0, 0, 0, 0, 0, 0, 0, 0, 0, 1, 1, 0, 0, 0, 0, 0, 0, 0, 1, 0],
15      [[0, 0, 0, 0, 0, 0, 0, 0, 0, 0, 0, 0, 0, 0, 0, 1, 1, 1,[1],0, 1, 0]],
         [0, 0, 0, 0, 0, 0, 0, 0, 0, 0, 0, 0, 0, 0, 0, 1, 0, 1, 1, 1, 0, 1, 0],
         [0, 0, 0, 0, 0, 0, 0, 0, 0, 0, 0, 0, 0, 0, 0, 1, 1, 0, 1, 1, 0, 1, 0],
         [0, 0, 0, 0, 0, 0, 0, 0, 0, 0, 0, 0, 0, 0, 0, 1, 1, 1, 0, 1, 0, 1, 0],  ~57
         [0, 0, 0, 0, 0, 0, 0, 0, 0, 0, 0, 0, 0, 0, 0, 1, 1, 1, 1, 0, 0, 1, 0],
         [1, 1, 1, 1, 1, 1, 1, 1, 1, 0, 0, 0, 0, 0, 0, 0, 0, 0, 0, 0, 1, 1, 0],
         [0, 0, 0, 0, 0, 0, 0, 0, 1, 1, 1, 1, 1, 1, 1, 1, 1, 1, 1, 1, 1, 0],
         [0, 0, 0, 0, 0, 0, 0, 0, 0, 0, 0, 0, 0, 0, 0, 0, 0, 0, 0, 0, 0, 0]  ])
```

FIG. 29

'specific_mat: REPRESENT POSTION IN MATRIX FOR POSITIVE ATTACK PATH

```
                                                          21
array( [ [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
   10    [0, 0, 0, 0, 0, 0, 0, 0, 0, 0, 0, 0, 0, 0, 0, 0, 0, 0, 0, 1, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],  ~57
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0],
         [0, 0, 0, 0, 0, 0, 0, 0, 0, 0, 0, 0, 0, 0, 0, 0, 0, 0, 0, 0, 0] ])
```

APPARATUS FOR INFERRING CYBERATTACK PATH BASED ON ATTENTION, AND APPARATUS AND METHOD FOR TRAINING INTELLIGENT ATTACK PATH PREDICTION MODEL

CROSS REFERENCE TO RELATED APPLICATION

This application claims the benefit of Korean Patent Application No. 10-2021-0104942, filed Aug. 10, 2021, which is hereby incorporated by reference in its entirety into this application.

BACKGROUND OF THE INVENTION

1. Technical Field

The disclosed embodiment relates to technology for analyzing a cyberattack surface of a computer network system.

2. Description of the Related Art

An attack graph visually represents all attack paths identified using information about assets of an organization and a Common Vulnerabilities and Exposures (CVE) database, and such attack paths can be exploited by attackers in order to reach an attack target system.

These days, a hacker attacks a target based on a systematic strategy established by carefully examining the target. Most organizations face difficulty in establishing a strategy for responding to such systematic attacks, because they have difficulty in managing a rapidly increasing number of IT devices, which results in neglectful network management, failure to understand network settings, failure to take appropriate measures even against already known vulnerabilities, or the like.

A vulnerability scan tool, which is one of methods used to check the security of an organization, determines whether vulnerabilities are present in individual hosts based on a network and provides a list containing only found vulnerabilities. However, when there is a large number of hosts to manage or a large number of vulnerabilities, this conventional simple checking is not sufficient to enable a security manager to determine an effective countermeasure.

In contrast, an attack graph enables a weak host or a threatening vulnerability on an attack path to be identified and enables key factors on the attack path to be visually identified through status analysis based on topology, thereby helping plan efficient and optimized countermeasures.

A representative study on attack graphs was conducted by Sushil Jajodia and Steven Noel. Here, each of exploits and security conditions (information exploitable by attackers, such as vulnerabilities) is modeled as a single node (vertex), and dependencies between nodes are expressed using an edge therebetween based on preconditions and postconditions of the respective nodes, whereby an attack graph is generated. Then, attack paths are derived by representing the attack graph as a list of security conditions. Also, in order to calculate a probabilistic value for representing a relative level of attack difficulty in each step of a process in which an attacker accesses a system having vulnerabilities and reaches a final destination via another system, a Bayesian network or Markov modeling is used.

As described above, an attack graph itself is useful to detect an attack surface of a corresponding organization by providing the probability that an attacker can reach a destination based on analysis of vulnerabilities in network hosts and topology analysis, but because a huge number of possible attack paths exists even in a network configured with a small number of hosts, a large-scale attack graph is generated. As a result, it is difficult to acquire detailed information for more effective responses from the visualized graph although intuitive information can be acquired therefrom.

An attack graph generated using vulnerability information enables various attack paths to be accurately analyzed, but has a problem in which a lot of expense, time and effort is required in order to generate and manage a vulnerability DB.

SUMMARY OF THE INVENTION

An object of the disclosed embodiment is to quickly predict a cyberattack surface of a network system at low cost using a machine-learning method.

Another object of the disclosed embodiment is to reduce costs, manpower, and time consumed for generating and managing a vulnerability DB.

An apparatus for training an intelligent attack path prediction model according to an embodiment includes memory in which at least one program is recorded and a processor for executing the program. The program may perform generating and collecting a virtual network topology and host asset information required for predicting cyberattack vulnerabilities in a computer network system; extracting at least one of global feature data and specific feature data from the collected network topology and host asset information; and training a neural network model for predicting attack vulnerabilities in the network system by using at least one of the extracted global feature data and specific feature data as training data.

Here, generating and collecting the virtual network topology and the host asset information may include generating the virtual network topology and the asset information required for predicting the cyberattack vulnerabilities in the computer network system; generating an edge between hosts in order to generate an attack graph; calculating a vulnerability score of each of the hosts and storing the same in an attack graph database; generating a connectivity matrix for representing the state of connection between the hosts in the network topology; generating an attack path using a function of generating a possible attack path using vulnerabilities based on a result of identification of assailable vulnerabilities and components, which are identified by receiving all possible paths between two hosts in the network; and constructing an intelligent-attack-graph learning database for training an attack vulnerability inference neural network model.

Here, generating the virtual network topology and the asset information may perform at least one of generating a network assets dictionary including a timestamp field for identifying a dictionary creation time, a system_states field for storing system state information of a network host, and a topology field for storing topology information of the network system; generating a graph object for generating a mock topology using a graph tool; randomly selecting the number of subnets within a range between predefined maximum and minimum numbers of subnets and assigning a router node to a graph; updating the network assets dictionary with router information; updating the network assets dictionary with subnet information; updating the network assets dictionary with router-to-router link information and host-to-router link information; and reading a CVE file, containing information about vulnerabilities in selected OSs and services, and assigning an OS and a service to each host in the topology by selecting the OS and the service.

Here, extracting at least one of the global feature data and the specific feature data may include reading a CSV file, generated by reflecting a vulnerability level of a software component, and generating an asset dictionary for encoding intelligent attack graph learning data; extracting feature data required for model training from the preconstructed intelligent attack graph learning data; generating global feature data for each topology to be used for model training; and generating positive attack path data and negative attack path data with which the intelligent attack path prediction model is to be trained.

Here, extracting the feature data may comprise extracting host IP addresses, host connection information, host asset information, a labeled attack path, and the like pertaining to a network for each network topology by referring to a topology table, a service table, and an attack path table of an intelligent-attack-graph learning database.

Here, the attack path data may be configured with global feature data, upper triangular topology matrix data, specific feature data, and upper triangular specific matrix data.

Here, generating the positive attack path data and the negative attack path data may comprise forming a negative attack path list by retrieving an index of a pair of hosts corresponding to a negative attack path, which is represented as an element value '1' in an upper triangular topology matrix and an element value '0' at the same position in a specific matrix.

Here, training the neural network model may include preprocessing the training data. Preprocessing the training data may include reading a predetermined number of pieces of positive attack path data and negative attack path data from a generated attack path data file; labeling a positive attack path and a negative attack path with different values; dividing all attack paths into training data and validation data; standardizing global feature data of the attack path data; and substituting a specific feature value, which represents an attack path in the attack path data as a host index, with a global feature value of a corresponding host in the topology.

Here, the neural network model may include an input layer configured with four fully-connected (dense) layers, each having 512 dimensions, so as to respectively process global feature data, upper triangular topology matrix data, specific feature data, and upper triangular specific matrix data in the attack path data, a hidden layer configured with a 1024-dimensional fully-connected layer, and an output layer configured with a two-dimensional fully-connected layer.

An apparatus for inferring a cyberattack path based on attention according to an embodiment includes memory in which at least one program is recorded and a processor for executing the program. The program may perform generating test data required for generating an intelligent attack graph; and generating an attack graph based on an intelligent attack path prediction model.

Here, generating the test data may include generating a new topology using a network simulator; extracting a network topology and asset information and storing the same in a database; and generating an attack graph by applying the new topology to a predictive attack graph generation model and storing the attack graph in a database.

Here, generating the attack graph based on the intelligent attack path prediction model may include extracting global features from the test data; and generating a number of pieces of test attack path data equal to the number of connections between hosts.

A method for training an intelligent attack path prediction model according to an embodiment may include generating and collecting a virtual network topology and host asset information required for predicting cyberattack vulnerabilities in a computer network system; extracting at least one of global feature data and specific feature data from the collected network topology and host asset information; and training a neural network model for predicting attack vulnerabilities in the network system by using at least one of the extracted global feature data and specific feature data as training data.

Here, generating and collecting the virtual network topology and the host asset information may include generating the virtual network topology and the asset information required for predicting the cyberattack vulnerabilities in the computer network system; generating an edge between hosts in order to generate an attack graph; calculating a vulnerability score of each of the hosts and storing the same in an attack graph database; generating a connectivity matrix for representing the state of connection between the hosts in the network topology; generating an attack path using a function of generating a possible attack path using vulnerabilities based on a result of identification of assailable vulnerabilities and components, which are identified by receiving all possible paths between two hosts in the network; and constructing an intelligent-attack-graph learning database for training an attack vulnerability inference neural network model.

Here, generating the virtual network topology and the asset information may perform at least one of generating a network assets dictionary including a timestamp field for identifying a dictionary creation time, a system_states field for storing system state information of a network host, and a topology field for storing topology information of the network system; generating a graph object for generating a mock topology using a graph tool; randomly selecting the number of subnets within a range between predefined maximum and minimum numbers of subnets and assigning a router node to a graph; updating the network assets dictionary with router information; updating the network assets dictionary with subnet information; updating the network assets dictionary with router-to-router link information and host-to-router link information; and reading a CVE file, containing information about vulnerabilities in selected OSs and services, and assigning an OS and a service to each host in the topology by selecting the OS and the service.

Here, extracting at least one of the global feature data and the specific feature data may include reading a CSV file, generated by reflecting a vulnerability level of a software component, and generating an asset dictionary for encoding intelligent attack graph learning data; extracting feature data required for model training from the preconstructed intelligent attack graph learning data; generating global feature data for each topology to be used for model training; and generating positive attack path data and negative attack path data with which the intelligent attack path prediction model is to be trained.

Here, the attack path data may be configured with global feature data, upper triangular topology matrix data, specific feature data, and upper triangular specific matrix data.

Here, generating the positive attack path data and the negative attack path data may comprise forming a negative attack path list by retrieving an index of a pair of hosts corresponding to a negative attack path, which is represented as an element value '1' in an upper triangular topology matrix and an element value '0' at the same position in a specific matrix.

Here, training the neural network model may include preprocessing the training data. Preprocessing the training data may include reading a predetermined number of pieces of positive attack path data and negative attack path data from a generated attack path data file; labeling a positive attack path and a negative attack path with different values; dividing all attack paths into training data and validation data; standardizing global feature data of the attack path data; and substituting a specific feature value, which represents an attack path in the attack path data as a host index, with a global feature value of a corresponding host in the topology.

Here, the neural network model may include an input layer configured with four fully-connected (dense) layers, each having 512 dimensions, so as to respectively process global feature data, upper triangular topology matrix data, specific feature data, and upper triangular specific matrix data in the attack path data, a hidden layer configured with a 1024-dimensional fully-connected layer, and an output layer configured with a two-dimensional fully-connected layer.

BRIEF DESCRIPTION OF THE DRAWINGS

The above and other objects, features, and advantages of the present invention will be more clearly understood from the following detailed description taken in conjunction with the accompanying drawings, in which:

FIG. 6 is an exemplary view illustrating training data according to an embodiment;

FIG. 8 is an exemplary view illustrating a topology table according to an embodiment;

FIG. 9 is an exemplary view illustrating host IP addresses extracted from a topology table according to an embodiment;

FIG. 10 is an exemplary view illustrating connectivity matrix information extracted from a topology table according to an embodiment;

FIG. 11 is an exemplary view illustrating a finally generated topology matrix according to an embodiment;

FIG. 12 is an exemplary view illustrating a service table according to an embodiment;

FIG. 13 is an exemplary view illustrating encoding of a software component in a service table according to an embodiment;

FIG. 14 is an exemplary view illustrating an attack table according to an embodiment;

FIG. 19 is an exemplary view illustrating global feature data;

FIG. 20 is an exemplary view illustrating upper triangular topology matrix data according to an embodiment;

FIG. 22 is an exemplary view illustrating assignment of all attack paths to a specific matrix according to an embodiment;

FIG. 23 is an exemplary view illustrating an upper triangular topology matrix according to an embodiment;

FIG. 24 is an exemplary view illustrating a specific matrix according to an embodiment;

FIG. 25 is an exemplary view illustrating a negative attack path list according to an embodiment;

FIG. 26 is an exemplary view illustrating a matrix representing states of physical connection between hosts in a current topology according to an embodiment;

FIG. 27 is an exemplary view illustrating the position of a negative attack path represented in a matrix according to an embodiment;

FIG. 28 is an exemplary view illustrating a positive attack path list according to an embodiment;

FIG. 29 is an exemplary view illustrating a matrix representing states of physical connection between hosts in a current topology according to an embodiment;

DESCRIPTION OF THE PREFERRED EMBODIMENTS

Figure 1:
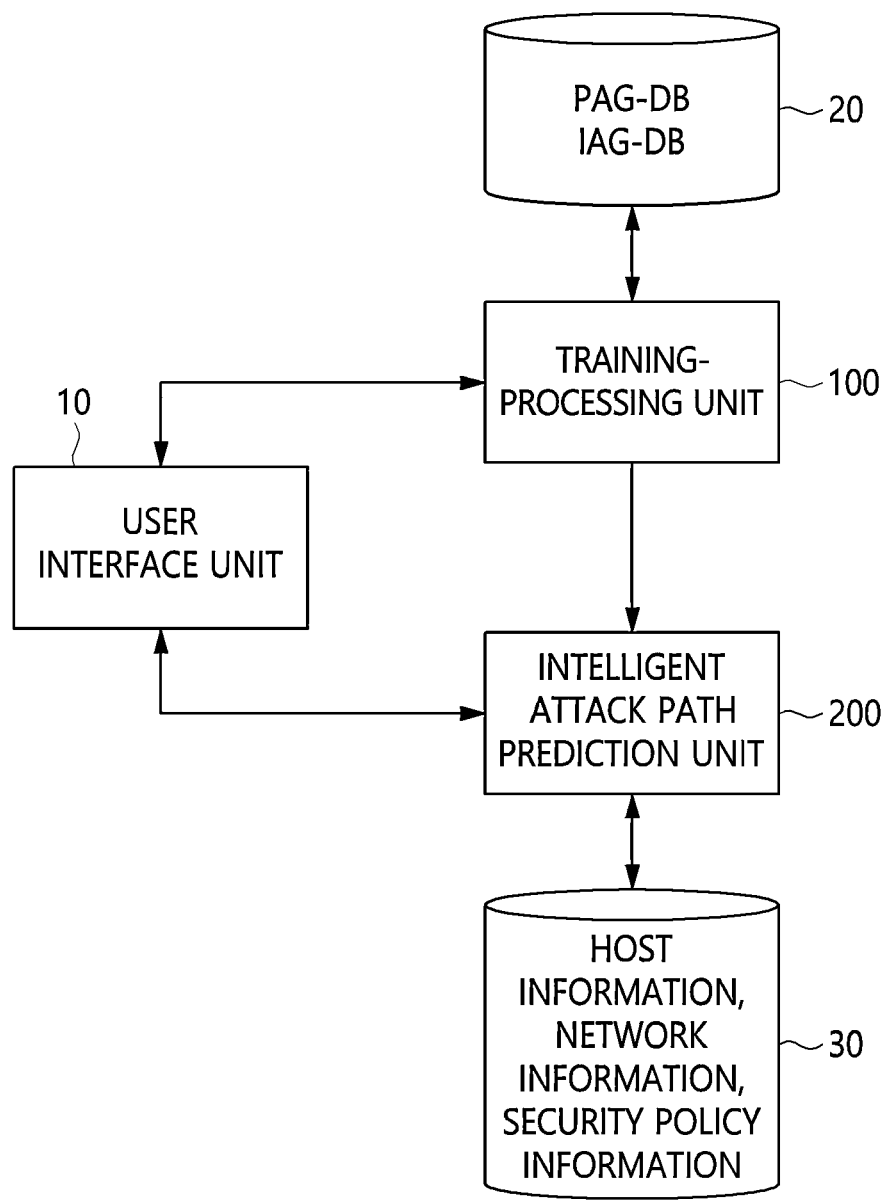
FIG. 1 is a view for explaining the operation of an apparatus for inferring a cyberattack path based on attention according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for inferring a cyberattack path based on attention according to an embodiment will be described in detail with reference to FIGS. 1 to 39.

FIG. 1 is a schematic block diagram of an apparatus for inferring a cyberattack path based on attention according to an embodiment.

Referring to FIG. 1, the apparatus for inferring a cyberattack path based on attention according to an embodiment may include a training-processing unit 100 and an intelligent attack path prediction unit 200.

The training-processing unit 100 collects virtual network topology and host asset information required for prediction of cyberattack vulnerabilities in a computer network system and trains an intelligent attack path prediction model, which is a neural network model that predicts attack vulnerabilities in the network system. The training-processing unit 100 will be described in detail later with reference to FIGS. 2 to 37.

The intelligent attack path prediction unit 200 receives actual network topology and asset information on a target computer network system for which cyberattack vulnerabilities are to be predicted, and predicts cyberattack vulnerabilities in the target network system using the pretrained intelligent attack path prediction model. The intelligent attack path prediction unit 200 will be described in detail later with reference to FIG. 38.

A user interface unit 10 visualizes and outputs an intelligent attack path, which is generated using a cyberattack vulnerability prediction method, by interworking with the training-processing unit 100 and the intelligent attack path prediction unit 200.

Figure 2:
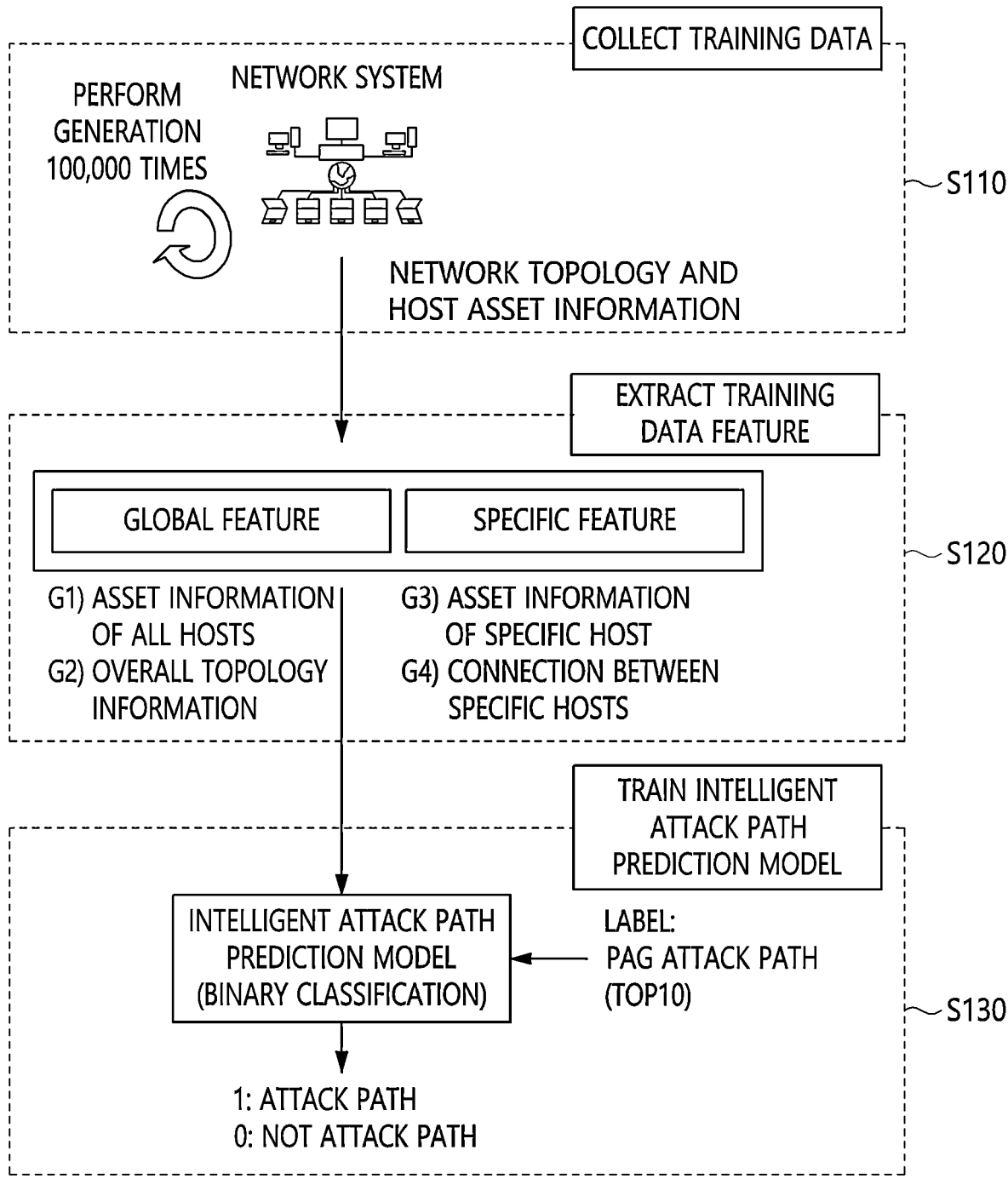
FIG. 2 is a schematic block diagram of a training-processing unit according to an embodiment.

FIG. 2 is a view for explaining the operation of a training-processing unit according to an embodiment.

Referring to FIG. 2, the training-processing unit 100 according to an embodiment generates and collects training data, including at least one of a virtual network topology and host asset information, at step S110. That is, a virtual network topology and host asset information required for predicting cyberattack vulnerabilities in a computer network system are generated and collected. Generating and collecting training data at step S110 will be described in detail later with reference to FIGS. 3 to 6.

Subsequently, the training-processing unit 100 according to an embodiment extracts global feature data and specific feature data from the training data, including the network topology and the host asset information, at step S120.

Here, extraction of the feature data may be performed for each topology. As shown in FIG. 2, global feature data may include overall network topology information (G2) and information about assets installed in all hosts (G1), and specific feature data may include information about a path between specific hosts (S2) and information about assets of a specific host (S1).

Also, extracting the feature data at step S120 may further include encoding text into numbers so as to enable a neural network model to process the same and converting data into data for representing network connectivity. Accordingly, the extracted feature data may be used as input data for the intelligent attack path prediction model. Extracting feature data at step S120 will be described in detail later with reference to FIGS. 7 to 30.

Subsequently, the training-processing unit 100 according to an embodiment trains the neural network model for predicting attack vulnerabilities in the network system by using at least one of the extracted global feature data and specific feature data as training data at step S130. Training the neural network model at step S130 will be described in detail later with reference to FIGS. 31 to 37.

Figure 3:
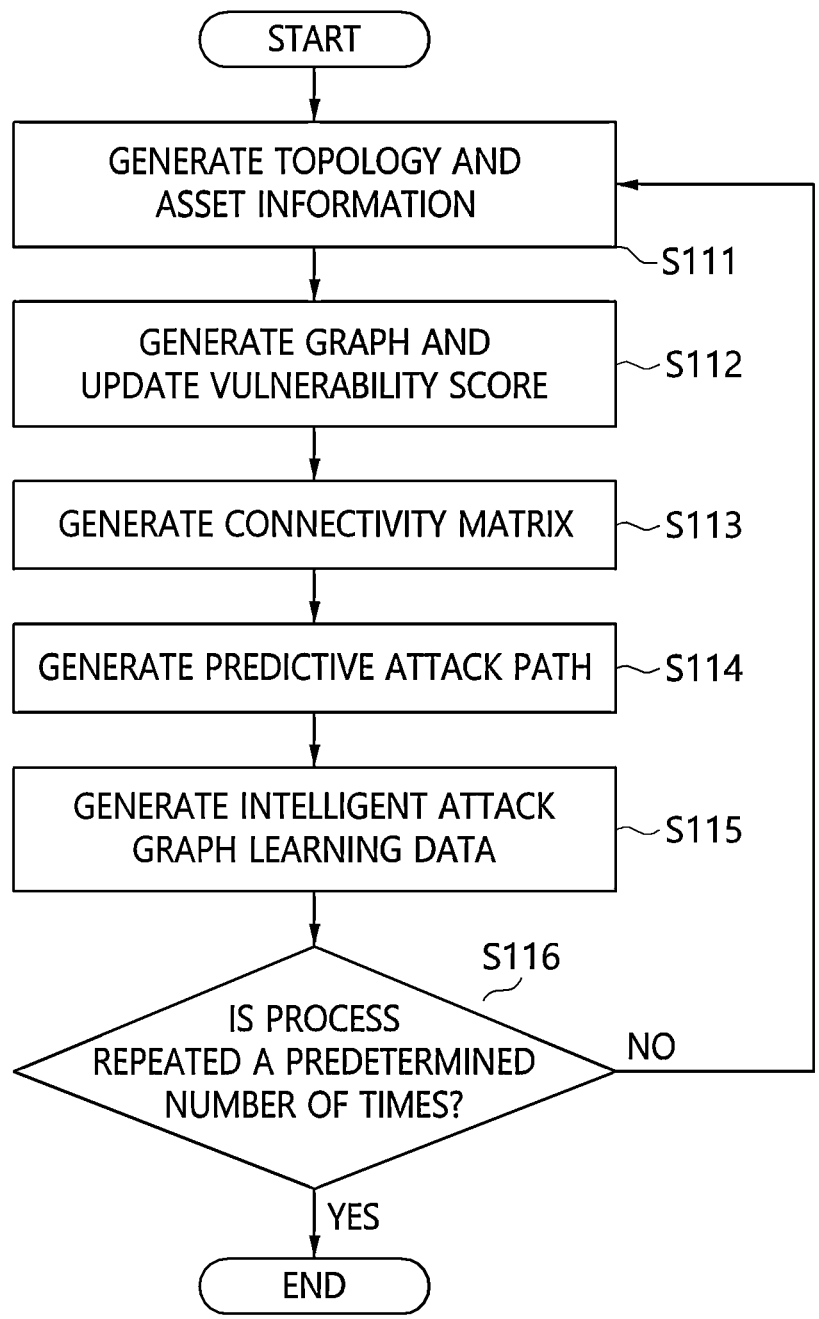
FIG. 3 is a flowchart for explaining in detail a step of generating and collecting training data according to an embodiment.

FIG. 3 is a flowchart for explaining in detail the step (S110) of generating and collecting training data according to an embodiment.

Referring to FIG. 3, the training-processing unit 100 generates and collects a virtual network topology and asset information required for predicting cyberattack vulnerabilities in a computer network system at step S111.

Specifically, at least one of generating a network assets dictionary, generating a mock graph (Graph (G)), setting a router and updating the dictionary, updating a subnet, updating a link, and updating a host may be performed at step S111.

First, at the step of generating a network assets dictionary, the schema of a network assets dictionary is defined in order to generate system state information and topology information.

An example of such a network assets dictionary may be shown in Table 1 below.

TABLE 1

```
{
  "timestamp":"2019_8_5_6_9_27",
  "system_states": [
    {
      "system_name": "h_ro_S0_0-192.168.10.2",
      "processes": [
        {
          "product": "netware",
          "version": "",
          "vendor": "novell",
          "cpe_2.3": "cpe:/o:novel:netware"
        }
      ],
      "operating system": {
        "product": "IOS",
        "cpe_2.3": "cpe:/o:IOS"
      },
      "reachability": [ ],
      "system_id": "h_ro_s0_0-192.168.10.2",
      "services":[
        {
          "service_id": "afpovertop",
          "protocol": "tcp",
          "port": 548
        }
      ],
      "networks":[
        {
          "subnet_mask": "255.255.255.0",
          "default_router": "192.168.10.1",
          "ip_address": "192.168.10.2",
          "mac_address": "26:25:5e:58:81:7f"
        }
      ],
      softwares": [ ]
    },
  "topology": {
    "subnets": [
    {
      "defaultgw": "192.168.10.1",
      "node": [
        {
          "defaultgw": "192.168.10.1",
          "interfaces": [
            {
              "ip_address": "192.168.10.2",
              "dnsname": "Unspecified",
              "speed": "Unspecified",
              "mask": "255.255.255.0"
            }
          ],
          "type": "host",
          "name": "h_r0_s0_0-192.168.10.2"
        },
      ],
      "netmask": "255.255.255.0",
      "id": "subnet_192.168.10.0",
      "netid": "192.168.10.0"
    },
    "links": [
    {
      "dstnode": "router_name_R_0",
      "srcnode":"h_r0_s0_0-192.168.10.2",
      "dstif": "192.168.10.1",
      "id": "link-h_ro_sc_0-192.168.10.2-router_name_R_0",
      "srcif": "192.168.10.2"
    },
    {
      "dstnode": "router_name_R_0",
      "srcnode": "h0_r0_s0_0-192.168.10.3",
      "dstif: "192.168.10.1",
      "id": "link-h_ro_s0_1-192.168.10.3-router_name_R_0",
      "srcif": "192.168.10.3"
    },
    ],
    "routers": [
    {
      "defaultgw": "192.168.1.1",
      "interfaces":[
        {
```

TABLE 1-continued

```
          "ip_address": "192.168.10.1",
          "mask": "255.255.255.0"
        },
        {
          "ip_address": "192.168.20.1",
          "mask": "255.255.255.0"
        }
      ],
      "type": "router",
      "name": "router_name_R_0"
    },
    ]
  }
}
```

Referring to Table 1, the network assets dictionary may include a "timestamp" field for identifying the dictionary creation time, a "system_states" field for storing system state information of a network host, and a "topology" field for storing topology information of a network system.

The value of the "timestamp" field is set to a system time at which the network assets dictionary is created.

The "system_states" field represents the system states of all hosts included in the network. The system state of each host is represented using the "system_name", "process", "operating_system", "system_id", "services", and "networks" fields.

The "topology" field includes "subnets", "links", and "routers" fields in order to represent a network system configuration and connection between components. Here, the "subnets" field is configured with nodes (=hosts) having the same default gateway in the network system, and may include "defaultgw", "node", "netmask", "id", and "netid" fields. The "links" field may include "dstnode", "srcnode", "dstif", "id", and "srcif" fields in order to represent physical connectivity between the components (hosts) of the network system. The "routers" field includes "defaultgw", "interfaces", "type", and "name" fields in order to represent a router in the network system.

Meanwhile, at the step of generating a mock graph, a mock topology is generated using graph tools/libraries (software applications, libraries) such as NetworkX. Here, a graph object (Graph (G)) for generating a NetworkX-based topology is generated.

At the step of setting a router, the number of subnets is randomly selected within the range between predefined minimum and maximum numbers of subnets, and a router node is assigned to the graph (Graph (G)). Also, the default gateway (defaultgw) of the router is set, the number of subnets pertaining to the router is set, the interface of the router is set, the number of hosts in each subnet is set, a switch and hosts are assigned to each subnet, router information (types and names thereof) is set, and the routers are connected with each other in the graph.

At the router update step, the network assets dictionary is updated with the router information (defaultgw, interfaces, type, and name).

At the subnet update step, the network assets dictionary is updated with the subnet information (defaultgw, node, netmask, id, and netid).

At the link update step, the network assets dictionary is updated with router-to-router link information and host-to-router link information. Here, the link information includes "dstnode', "srcnode", "dstif", "id", and "srcif" fields.

At the host update step, CVE files (CVE_OS_WEIGHT.csv and CVE_SERVICE_WEIGHT.csv) containing information about vulnerabilities in selected OSs and services are read, and an OS and a service are selected and assigned to each of the hosts in the topology.

Here, the files (CVE_OS_WEIGHT.csv and CVE_SERVICE_WEIGHT.csv) containing information about vulnerabilities in OSs/services are used in order to store and manage selected OSs and services in consideration of the number of vulnerabilities (CVE) in each software component and CVSS scores indicating the severity of the corresponding vulnerabilities based on known vulnerability information of the software components managed in the National Vulnerability Database (NVD).

Table 2 is an example of the CVE_OS_WEIGHT.csv file, and Table 3 is an example of the CVE_SERVICE_WEIGHT.csv file.

TABLE 2

|  | CVE_coun | CPE_mean | CPE_mean | SCORE | CPE_part | TOP1 | TOP2 |
|---|---|---|---|---|---|---|---|
| CentOS | 2 | 5.75 | 1 | 0.575 | o | CVE-2011-4144, 6.8 | CVE-2009-3564, 4.7 |
| Debian_linux | 1070 | 5.83 | 9.717 | 5.655 | o | CVE-2016-0749, 10 | CVE-2016-1629, 10 |
| Fedora | 561 | 5.91 | 8.818 | 5.211 | o | CVE-2015-1815, 19 | CVE-2015-2806, 10 |
| FreeBSD | 356 | 5.72 | 8.184 | 4.681 | o | CVE-2002-0391, 10 | CVE-2003-0466, 10 |
| IOS | 474 | 6.7 | 8.583 | 5.751 | o | CVE-2002-1359, 10 | CVE-2002-1360, 10 |
| Junos | 111 | 6.41 | 6.561 | 4.205 | o | CVE-2013-4685, 10 | CVE-2016-1279, 10 |
| Linux_kernel_2 | 956 | 4.96 | 9.56 | 4.742 | o | CVE-2016-1523. 10 | CVE-2008-1673, 10 |
| Linux_kernel_3 | 690 | 5.79 | 9.106 | 5.272 | o | CVE-2016-2065, 10 | CVE-2016-5344, 10 |

TABLE 3

| PORT | PROTOCOL | SERVICE | CVE_ID | VENDOR | PRODUCT | CPE_part | CPE_count | CPE_mean |
|---|---|---|---|---|---|---|---|---|
| 1 | tcp | tcpmux | CVE-2012-0862 | xinetd | xinetd | a | 8 | 5.95 |
| 20 | tcp | FTP-data | CVE-2002-2307 | pyramid | benhur_sofware_update | a | 1 | 5.00 |
| 21 | tcp | FTP | CVE-2002-0779 | novell | bordemanager | a | 13 | 5.77 |
| 23 | tcp | FTP | CVE-2015-7261 | qnap | iartist_lite | a | 2 | 8:00 |
| 21 | tcp | FTF | CVE-2015-7261 | qnap | signage_station | a | 3 | 8.33 |
| 22 | tcp | SSH | CVE-2017-3819 | cisco | asr_5000_series_software | a | 17 | 5.45 |
| 22 | top | SSH | CVE-2017-3819 | cisco | virtualized_packet_core | a | 3 | 7.27 |

Basically, a single OS is randomly selected, and n services are randomly selected within the range between preset maximum and minimum numbers. The selected values are used to update the network assets dictionary. In the service information, fields such as service_id, protocol, port, and the like are updated, and in the process information, fields such as product, version, vendor, cpe2.3, and the like are updated. Also, fields such as system_name, processes, operating_system, system_id, services, subnet mask, default_router, ip_address, mac_address, and the like are updated.

Through the above-described step (S111) of generating a topology and an assets dictionary, node and link information based on which a NetworkX-based graph can be generated is prepared, whereby a network topology represented using nodes and links may be generated.

Referring again to FIG. 3, the training-processing unit 100 generates an edge between hosts in order to generate an attack graph, calculates a vulnerability score for each host, and stores the same in an attack graph database AG-DB 20 at step S112. Here, the vulnerability score of each host is calculated based on the OS and service installed in the host.

Subsequently, the training-processing unit 100 generates a connectivity matrix for representing the state of connection between hosts in the network topology at step S113.

Figure 4:
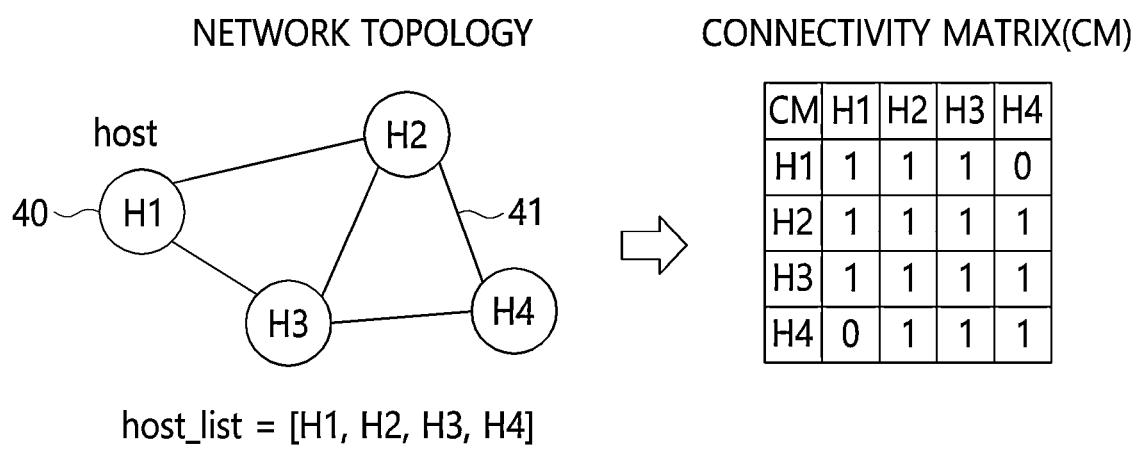
FIG. 4 is an exemplary view illustrating a connectivity matrix according to an embodiment.

FIG. 4 is an exemplary view of a connectivity matrix according to an embodiment.

Referring to FIG. 4, a connectivity matrix uses an adjacency matrix that represents connections 41 between nodes 40 in graph theory. In the connectivity matrix, the state of connection between hosts in a network topology is represented as '0' or '1'.

That is, as shown in FIG. 4, hosts in a host list are sequentially assigned as the row indices and column indices of the matrix, and when two hosts are connected to each other, the value of the corresponding element is represented as '1', whereas when two hosts are not connected to each other, the value of the corresponding element is represented as '0'.

Referring again to FIG. 3, the training-processing unit 100 generates a predictive attack path at step S114.

Here, using a function of generating a possible attack path using vulnerabilities, which is disclosed in a related invention (Korean Patent Application Publication No. 10-2018-0113508), all possible paths between two hosts in a network are received as input, a vulnerability or a component that can be exploited for an attack is identified, and a function of generating an attack path based thereon may be performed.

The attack path generated in this way is stored in the attack graph database PAG-DB 20.

Here, a predictive attack graph is an attack graph generated in such a way that all attack paths exploitable for an attack on a specific target are extracted and recorded in a database and an edge is drawn only when there is the possibility of two assets being connected to each other through open ports, or the like, without calculating scores for all of the paths.

Here, the predictive attack graph determines all hosts that can be damaged by an attacker located at the initially set start point. Here, when a vulnerability is eliminated by a firewall or the like through an accurately predicted vulnerability elimination effect, the edge related thereto is removed from the graph. In this way, nodes unreachable from the start point are discovered, and graph generation costs may be reduced.

In an embodiment, when there is no path connecting two assets, such as ports, services, and the like, according to policies, the assets are regarded as being unlikely to be used for an attack path, so an edge therebetween is not drawn. A target is a host designated by an administrator, and a source is a host designated by the administrator or an arbitrary host.

Meanwhile, referring again to FIG. 3, the training-processing unit 100 constructs an intelligent-attack-graph learning database 20 for training a cyberattack vulnerability inference neural network model at step S115.

Collecting the training data at step S110, which is performed through steps S111 to S115 described above, may be repeated a predetermined number of times (N times) at step S116. Through the training data collection process that is repeated N times (e.g., 100,000 times), training data, including a network topology, information about the states of assets installed in network hosts, and attack paths (with labels), is generated.

Figure 5:
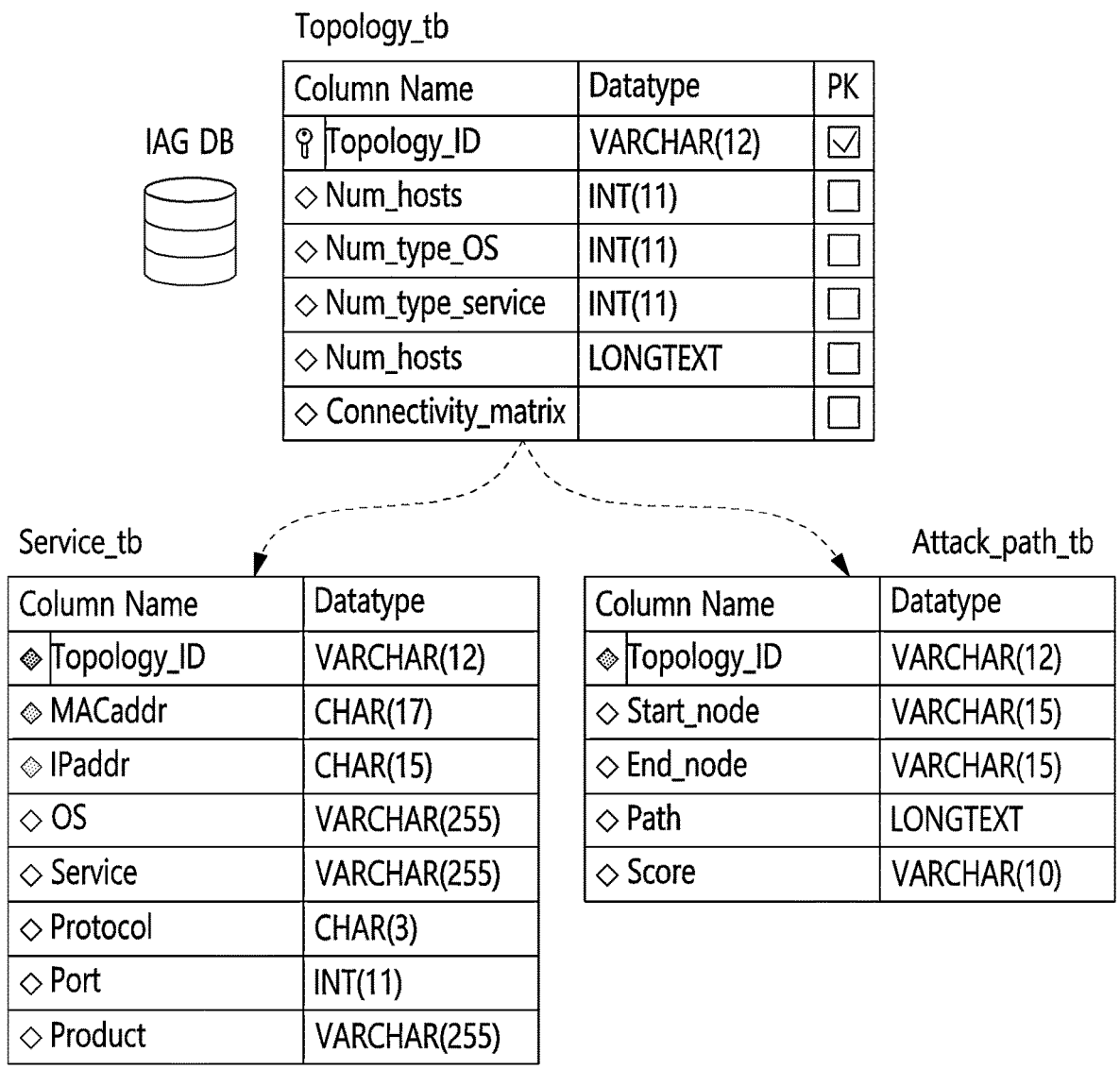
FIG. 5 is an exemplary view illustrating an intelligent attack graph according to an embodiment.

FIG. 5 is an exemplary view of an intelligent attack graph according to an embodiment.

Referring to FIG. 5, an intelligent attack graph learning DB may include a topology table Topology_tb, a service table Service_tb, and an attack path table Attack_path_tb.

Table 4 below is an example of a topology table.

TABLE 4

| Topology_ID | Num_hosts | Num_type_OS | Num_type_service | List_hosts | PRODUCT |
|---|---|---|---|---|---|
| t_0 | 17 | 16 | 42 | ['192. 168. 20. 6', 192, 168. 30. 2', 192, 188. 30. 3, 192. 168. 40. 2', '19 . . . | [0, 0. 0, 0, 0, 0, 0, 0, 0, 0, 1, 1, 1, 1. 0. 0, 1, 0, 0, 0 . . . |
| t_0 | 12 | 11 | 29 | ['192. 168. 30. 2', 192. 168. 30. 3', 192. 168. 30. 4, 192. 168. 40. 5, "ro . . . | [0, 1, 1, 1, 1, 0, 0, 0, 0, 0, 0, 0, 0, 0, 1. 0 1, 1, 1, 0 . . . |

Referring to Table 4, the topology table may include a topology ID (Topology_ID), the number of hosts (Num_hosts), the number of OS types (Num_type_OS), the number of service types (Num_type_service), a host list (List_hosts), and a connectivity matrix (Connectivity_matrix).

Here, the topology ID is an identifier for identifying a topology, the number of hosts is a total number of hosts constituting the corresponding topology, the number of OS types is a total number of types of OSs installed in the hosts, the number of service types is a total number of types of services installed in the hosts, a host list enumerates all hosts constituting the topology, and each of the hosts is represented by the IP address thereof. The connectivity matrix represents connectivity between the hosts in the topology by representing hosts adjacent to each other as '1' and representing hosts that are not adjacent to each other as '0'.

Table 5 below is an example of a service table.

TABLE 5

| Topology_ID | MACador | IPaddr | OS | PROTOCOL | PORT | PRODUCT |
|---|---|---|---|---|---|---|
| t_0 | 52:86:ca:c3:9e:ce | 192.168.20.6 | Iso-tsap | tcp | 102 | simatic_cp_443-1 |
| t_0 | 52:86:ca:c3:9e:ce | 192.168.20.6 | iso-tsap | tcp | 102 | simatic_s7-300_cpu_firmware |
| t_0 | 7e:8e:ca:83:2b:d4 | 192.168.40.6 | apex | tcp | 912 | realwin |
| t_0 | 7e:8e:ca:83:2b:d4 | 192.168.40.6 | HTTPS | tcp | 443 | telepresence_system_software |
| t_0 | 7e:8e:ca:83:2b:d4 | 192.168.40.6 | applicatio | tcp | 873 | big-ip_webaccelerator |
| t_0 | 7e:8e:ca:83:2b:d4 | 192.168.40.6 | printer | tcp | 515 | acrobat_reader |
| t_1 | ed:f1:38:4e:7d:0f | 192.168.10.5 | ipmi | udp | 623 | system_x3530_m4 |
| t_1 | ed:f1:38:4e:7d:0f | 192.168.10.5 | HTTPS | tcp | 443 | dsl-n55u |
| t_1 | 3a:4c:6c:5e:5a:6 | 192.168.10.2 | SSH | tcp | 22 | netiron_ces_2024c-4x |
| t_1 | 3a:4c:6c:5e:5a:6 | 192.168.10.2 | ipmi | udp | 623 | system_x3400_m2 |
| t_1 | 3a:4c:6c:5e:5a:6 | 192.168.10.2 | afpowertcp | tcp | 546 | netware |

Referring to Table 5, the service table includes a topology ID (Topology_ID), the MAC address (MACaddr) of a host, the IP address (IPaddr) of the host, the OS (OS) of the host, the service (Service) of the host, the transport protocol (Protocol) of the service, a service port (Port), and the product name (Product) of the host.

Here, the topology ID is an identifier for identifying a topology, and when the topology ID in the topology table is the same as that in the service table, they indicate the same topology. 'MACaddr' indicates the Medium Access Control (MAC) address of a host. 'IPaddr' indicates the Internet Protocol (IP) address of the host. 'OS' indicates the OS installed in the host. 'Service' indicates the service installed in the host. 'Protocol' and 'Port' respectively indicate a protocol and a port number used for executing the service. 'Product' indicates the name of the product in which the corresponding service is installed.

Table 6 below is an example of an attack path table.

TABLE 6

| Topology_ID | Start node | End node | Path | Score |
|---|---|---|---|---|
| t_0 | 192.168. 40. 4 | 192. 168. 40. 5 | ['192. 168. 40. 4', '192. 168: 40. 5'] | 0.09611537 |
| t_0 | 192. 168.40. 5 | 192. 168. 40. 4 | ['192. 168. 40. 5', '192. 168. 40. 4'] | 0.09611537 |
| t_0 | 192. 168. 40. 2 | 192. 168. 40. 3 | ['192. 168. 40. 2', '192. 168. 40. 3'] | 0.09268937 |
| t_0 | 192. 168. 40. 3 | 192. 168. 40. 2 | ['192. 168. 40. 3', '192. 168: 40. 2'] | 0.09268937 |
| t_0 | 192. 168. 40. 4 | 192. 168. 40. 3 | ['192. 168. 40. 4', '192. 168. 40. 3'] | 0.07665768 |
| t_0 | 192. 168. 40. 3 | 192. 168. 40. 4 | ['192. 168. 40. 3', '192. 168. 40. 4'] | 0.07665768 |

Referring to Table 6, the attack path table includes a topology id (Topology_ID), a start node (Start_node), an end node (End_node), a path (Path), and a score (Score).

Here, the topology id is an identifier for identifying a topology. When the topology ID in the topology table is the same as that in the service table, they indicate the same topology. 'Start_node' indicates the start node of an attack path indicated by 'Path'. 'End_node' indicates the end node of the attack path. 'Path' indicates an attack path, the start and the end of which are respectively indicated by 'Start_node' and 'End_node', and intermediate nodes are represented if they exist, but may be omitted if not. 'Score' indicates the severity score of the corresponding attack path.

PAG-DB 20 includes all attack paths in a topology and the severity score of each of the paths.

Accordingly, among all of the paths in the PAG-DB 20, the N (e.g., 10) top attack paths sorted in descending order of severity score are selected and stored in the attack path table at the step (S115) of generating intelligent attack graph learning data.

FIG. 6 is an exemplary view of training data according to an embodiment.

Referring to FIG. 6, the intelligent attack graph learning data includes N (e.g., 100,000) pieces of topology data, and each piece of topology data includes K pieces of host asset state information.

Here, the variable K may have a different value depending on the number of randomly generated hosts and the number of installed assets (e.g., OSs and services), which are set at the above-described step (S111) of generating topology and asset information. That is, the value of K may be set differently for each topology.

Also, each topology includes M attack paths to be used as a label (correct answer).

Here, the constant M (e.g., 10) corresponds to the M top attack paths having the highest severity in the network topology. At the above-described step (S111) of generating topology and asset information, an arbitrary value (e.g. 10) is set as the value of M, and the value is identically applied to all topologies, after which training data is generated.

For example, data for training a model may be generated as follows.

A random network topology is generated using a network simulation tool (NetworkX), and three or fewer asset information tuples are randomly selected from asset information (OSs, services, protocols, products, and the like), which is registered in the NVD CVE vulnerability database, and assigned to hosts in the network. When the network is configured, the total number of nodes is fixed to 23 in consideration of 1~3 routers, 3~5 subnets for each router, and 3~6 hosts for each subnet. A total of 100,000 topologies is generated, and 10 top attack paths are generated for each of the topologies, whereby a total of one million attack paths is generated as labeled data.

Figure 7:
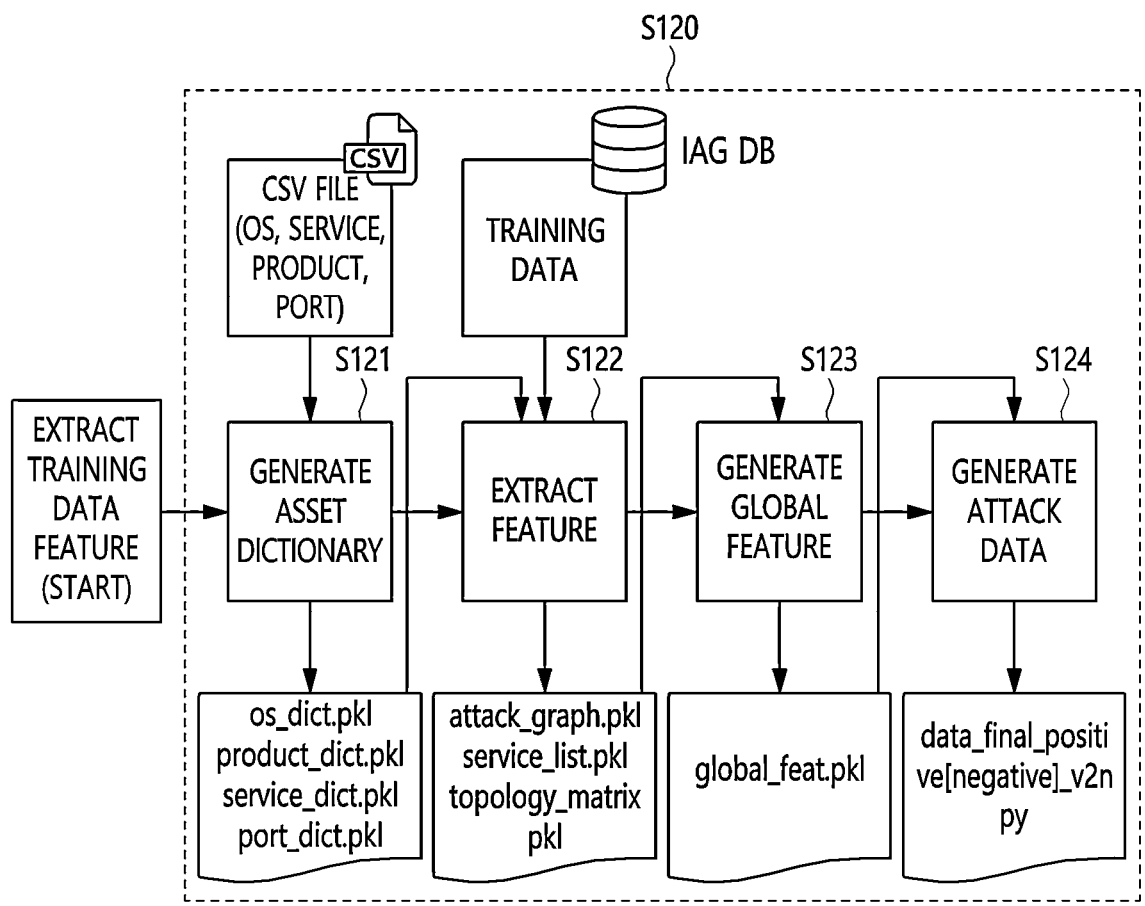
FIG. 7 is a view for explaining in detail a step of extracting training data features according to an embodiment.

FIG. 7 is a view for explaining in detail extraction of training data features at step S120 according to an embodiment.

Referring to FIG. 7, the training-processing unit 110 reads CSV files (CVE_OS_WEIGHT.csv and CVE_SERVICE_WEIGHT.csv), which are generated by reflecting the vulnerability levels of software components), thereby generating an asset dictionary for encoding the intelligent attack graph learning data at step S121.

Here, dictionaries for OSs, services, ports, and products are generated. First, integer indices are respectively assigned to all types of OSs in the CSV file (CVE_OS_WEIGHT-.csv), which contains information about vulnerabilities in OSs, whereby an OS dictionary (os_dict.pkl) is generated.

Similarly, integer indices are assigned to the types of services, the types of ports, and the types of products in the CSV file (CVE_SERVICE_WEIGHT.csv), which contains information about vulnerabilities in software components, whereby a service dictionary (service_dict.pkl), a port dictionary (port_dict.pkl), and a product dictionary (product_dict.pkl) are generated.

Subsequently, the training-processing unit 100 extracts feature data required for training the model from the intelligent attack graph learning data, which is generated through the above-described step (S115) of generating intelligent attack graph learning data, at step S122.

Here, the IP addresses of hosts included in a network, host connectivity information, information about assets of the hosts, labeled attack paths, and the like are extracted for each network topology (e.g., t_00000, t_00001, or the like) with reference to the topology table, the service table, and the attack path table in the intelligent-attack-graph learning database iagDB.

Figure 10:
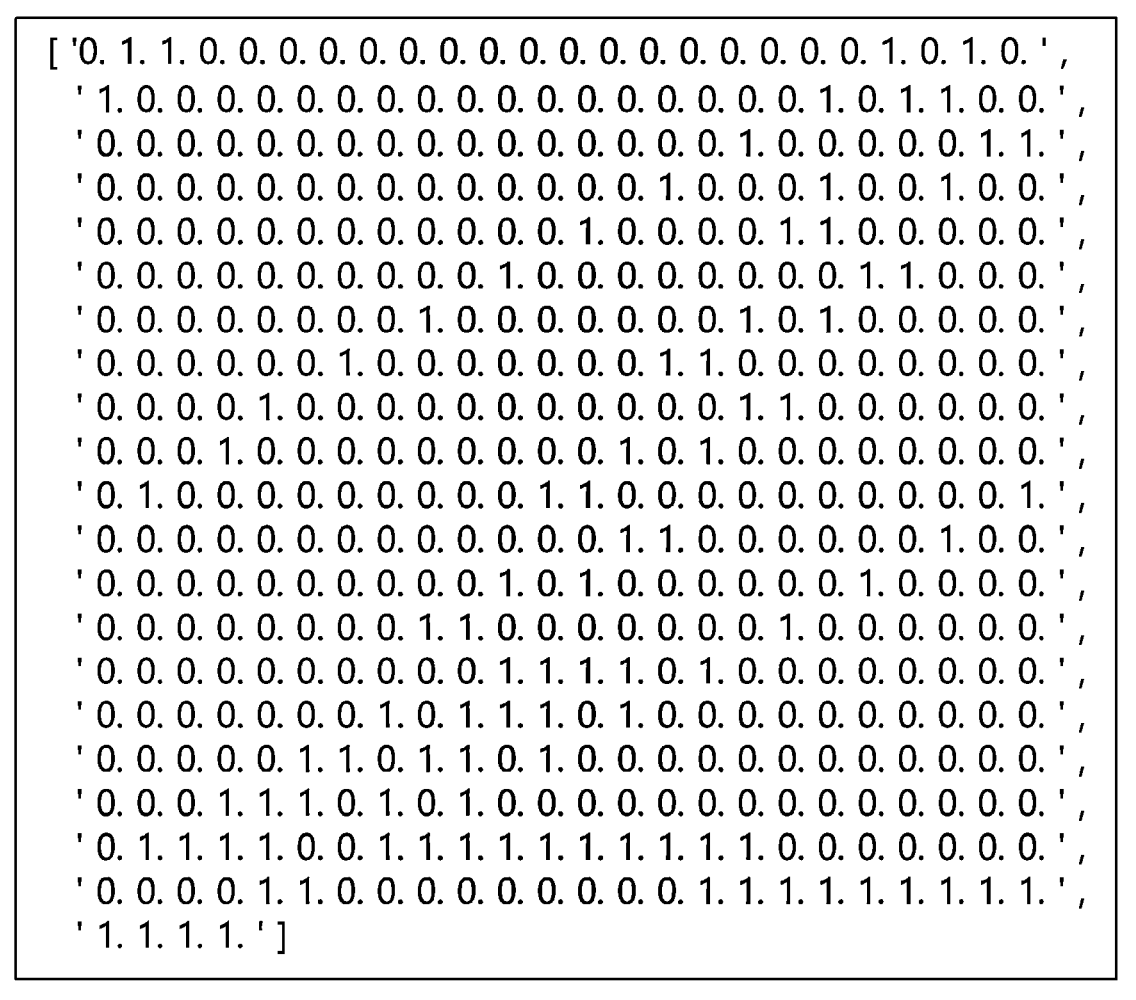

FIG. 8 is an exemplary view of a topology table according to an embodiment, FIG. 9 is an exemplary view of host IP addresses extracted from a topology table according to an embodiment, FIG. 10 is an exemplary view of connectivity matrix information extracted from a topology table according to an embodiment, and FIG. 11 is an exemplary view of a finally generated topology matrix according to an embodiment.

That is, the IP addresses of the hosts included in the network are extracted from the 'List_hosts' field of the topology table in FIG. 8 and listed as shown in FIG. 9.

Also, a connectivity matrix (Connectivity_matrix), which represents the state of connection between hosts, is extracted from the topology table in FIG. 8, as shown in FIG. 10.

Also, for each of all of the topologies stored in the topology table of iagDB, the integer part (e.g., '00000') of the value of 'Topology_ID' is set as an index, and a host IP list and a connectivity matrix, grouped as a pair in association with the index, are saved in a file (topology_matrix.pkl), as shown in FIG. 11.

Figure 13:
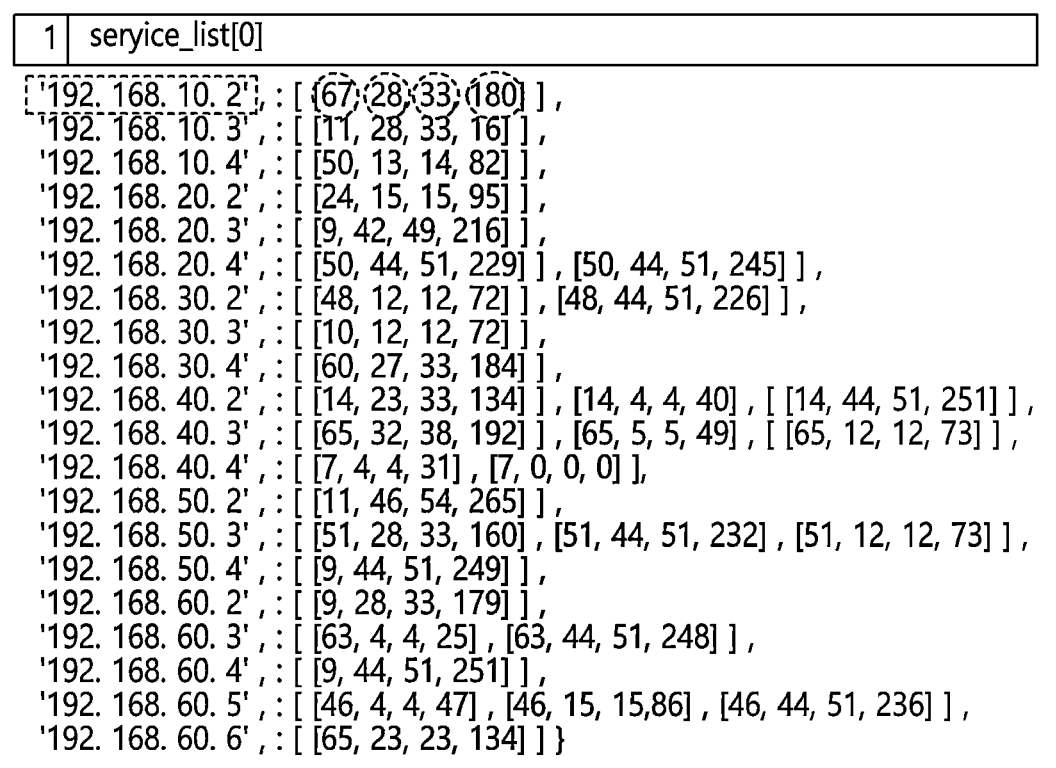

FIG. 12 is an exemplary view of a service table according to an embodiment, and FIG. 13 is an exemplary view of encoding of software component information in a service table according to an embodiment.

Host IP addresses, OS information, service information, port information, and product information for each topology are extracted from the service table illustrated in FIG. 12. That is, for each topology, the IP addresses of all hosts included in the topology are extracted. Also, information about software components (an OS, a service, a port, and a product) installed in each of the hosts is extracted. The number of software components installed in each of the hosts may vary depending on the system using the components, but in an embodiment, a description is made on the assumption that a maximum of three software components are installed. Then, the information about the software components (an OS, a service, a port, and a product) installed in the host is encoded with reference to the asset dictionaries (os_dict, service_dict, port_dict, and product_dict). Here, 'os', 'service', 'port', and 'product' constitute a single tuple, and a maximum of three tuples may be formed for each host. This process is performed for all of the topologies, and the result thereof is saved as a file (service_list.pkl).

FIG. 14 is an exemplary view of an attack path table according to an embodiment.

Referring to FIG. 14, attack paths to be used as labeled data for a training model are extracted from the attack path table. The attack path data ('Path') configured with host IP addresses is configured in a list form for each topology and saved as a file (attack_graph.pkl).

Referring again to FIG. 7, the training-processing unit 100 generates global feature data for each topology, which is to be used for training a model, at step S123.

Here, assets dictionary data (os_dict.pkl, service_dict.pkl, port_dict.pkl, and product_dict.pkl) and feature data (topology_matrix.pkl, service_list.pkl, and attack_graph.pkl) are used as input. Among the feature data files, the service list file (service_list.pkl) contains host IP addresses pertaining to each topology and information about encoding of software components (an OS, a service, a port, and a product) installed in each host.

In each topology, N hosts and a router may be installed, and the number thereof may be set to a maximum of 23 in an embodiment. Also, in an embodiment, a maximum of three software components are installed in each host.

Figure 15:
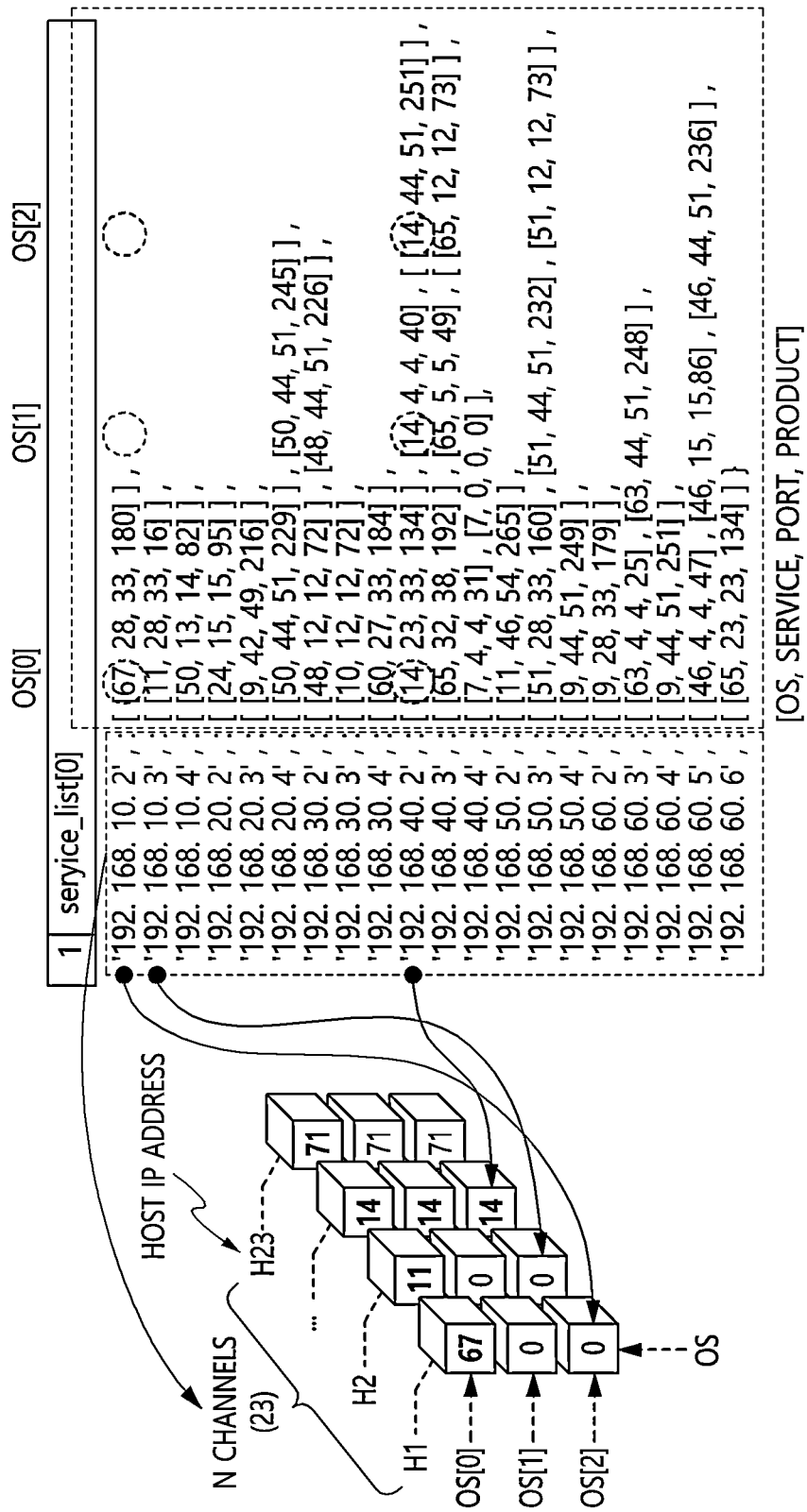
FIG. 15 is an exemplary view illustrating a global feature data configuration including a 3D OS vector and N channels of hosts according to an embodiment.
Figure 16:
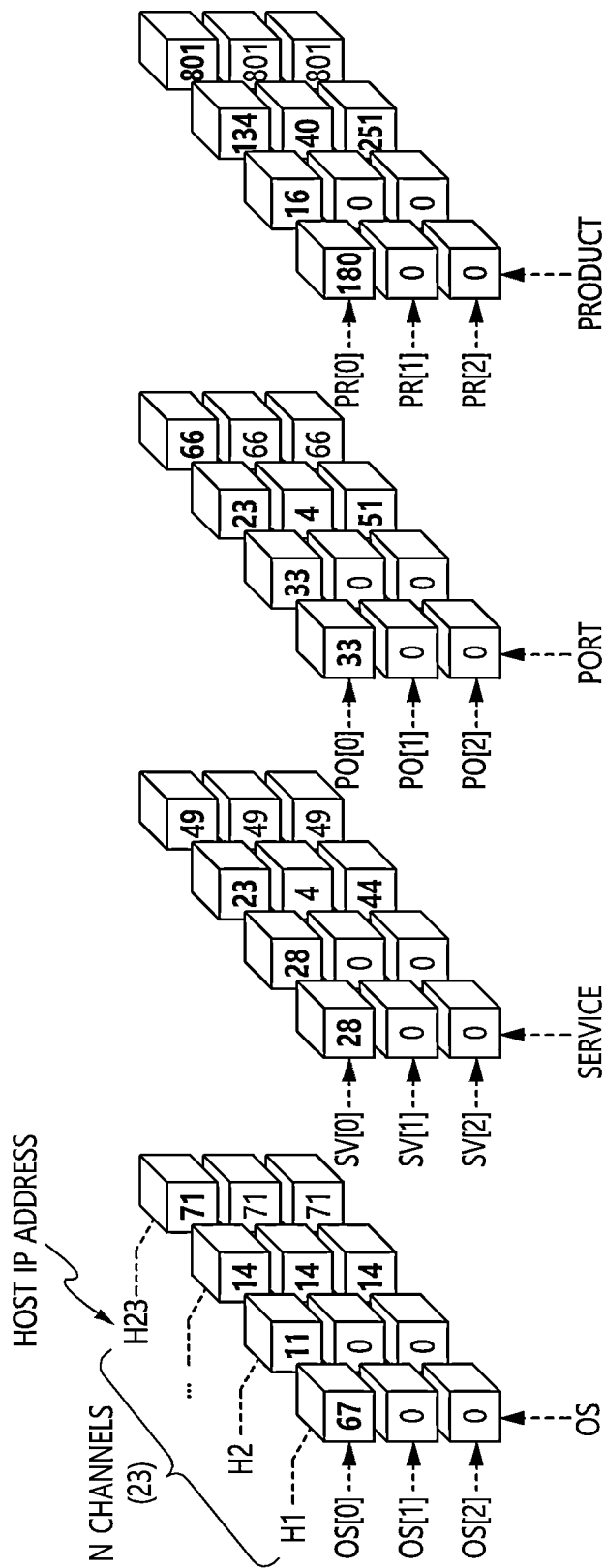
FIG. 16 is an exemplary view illustrating OS, service, port, and product vectors, a channel configuration, and assignment of service list values according to an embodiment.
Figure 17:
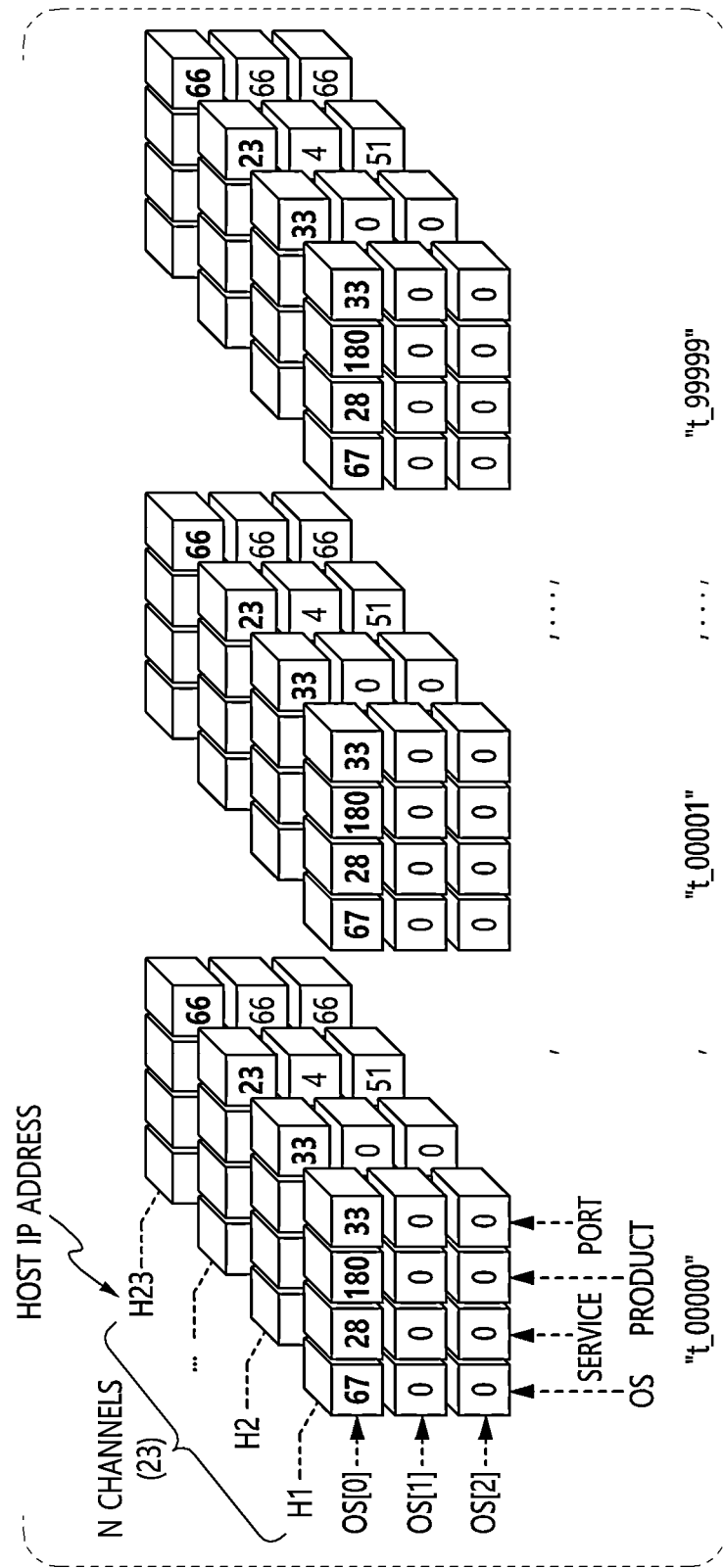
FIG. 17 is an exemplary view illustrating the configuration of a tensor containing features of software components of all hosts in each topology according to an embodiment.

FIG. 15 is an exemplary view of a global feature data configuration including 3D OS vectors and N channels of hosts according to an embodiment, FIG. 16 is an exemplary view of OS, service, port, and product vectors, a channel configuration, and assignment of service list values according to an embodiment, and FIG. 17 is an exemplary view of the configuration of a tensor containing the features of software components of all hosts in each topology according to an embodiment.

Referring to FIG. 15, in the case of an OS, among software components, an OS vector OS [0:2] is configured as a 3D vector, and N (=23) channels of OS vectors, corresponding to the number of hosts, are formed. Then, values corresponding to the OSs, among software components installed in each host, are sequentially read from the service list and assigned to the respective dimensions of the OS vector of the host.

Referring to FIG. 16, through a similar process, a 3D service vector, a 3D port vector, and a 3D product vector are formed, and N (=23) channels thereof for the respective hosts are formed, after which values corresponding to a service, a port, and a product, among the software components, are read from the service list and assigned to the dimensions of the respective vectors.

Subsequently, the OS, service, product, and port vectors are sequentially concatenated in the order in which they are listed so as to form a 3×4 matrix for each host, and the N (=23) channels of host data are concatenated, whereby a 3×4×23 tensor is formed, as shown in FIG. 17. This process is performed for each topology, whereby global feature data is generated in the form of a single list configured using the tensor generated for each topology, and is then saved as a file (global_feat.pkl).

Referring again to FIG. 7, the training-processing unit 100 generates positive attack path data and negative attack path data, with which the intelligent attack path prediction model is to be trained, at step S124.

First, all of the files generated in the previous process (attack_graph.pkl, service_list.pkl, topology_matrix.pkl, os_dict.pkl, product_dict.pkl, service_dict.pkl, port_dict.pkl, and global_feat.pkl) are read.

Also, the connectivity matrix, the attack path, the host IP list, and the like are processed for the same topology, and after a process for one topology is finished, the same process is repeated for the topology subsequent thereto.

Table 7 below is an exemplary view of attack path data.

TABLE 7

| | global feature (global_feature) | topology (topt_mat_upper) | specific feature (specific_feature) | upper triangular specific matrix (specific_mat_upper) |
|---|---|---|---|---|
| n = 1 | 276 | 253 | 3 | 253 |

Referring to Table 7, the attack path data may be configured with global feature data, upper triangular topology matrix data, specific feature data, and upper triangular specific matrix data.

Here, the global features are data of 276 dimensions, the upper triangular topology matrix is data of 253 dimensions, the specific features are data of 3 dimensions, and the upper triangular specific matrix is data of 253 dimensions, so attack path data of a total of 785 dimensions may be formed. Also, two million samples of negative attack paths and one million samples of positive attack paths, with which the model is to be trained, are generated.

Figure 18:
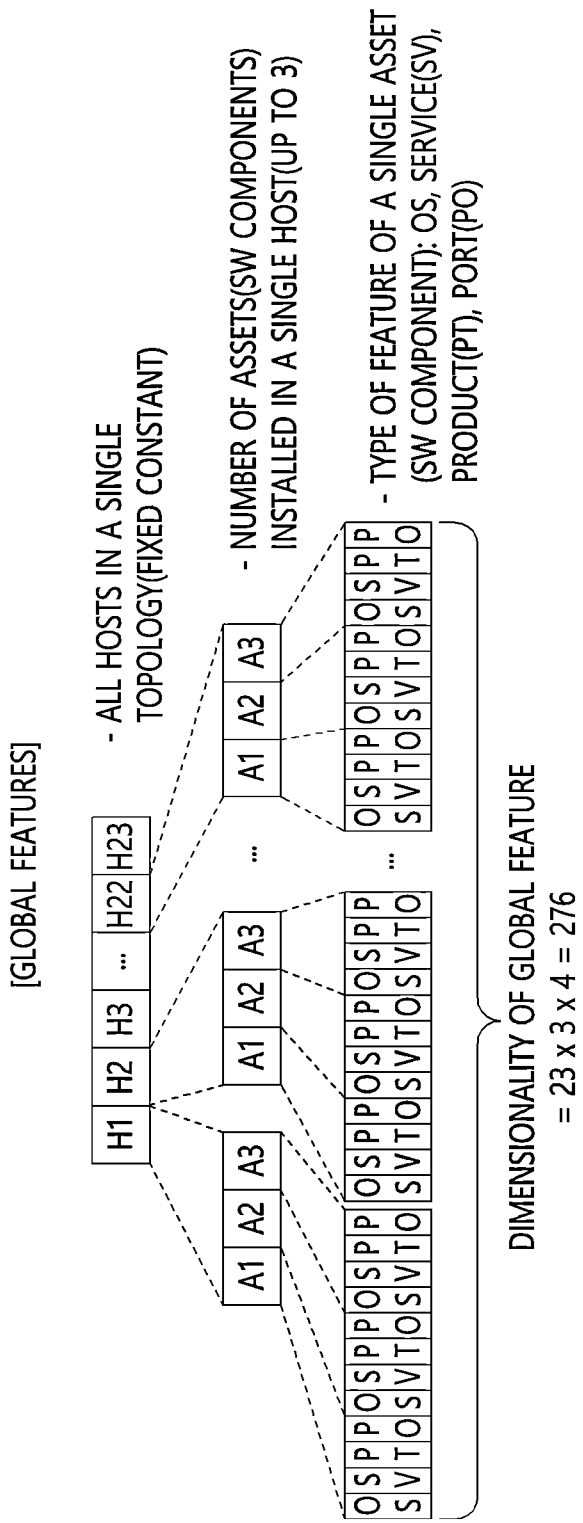
FIG. 18 is an exemplary view illustrating a global feature data configuration process according to an embodiment.

FIG. 18 is an exemplary view of the process of configuring global feature data according to an embodiment, and FIG. 19 is an exemplary view of global feature data.

Referring to FIG. 18, the global features are data in the form of a 276-dimensional vector acquired by reconfiguring a 3D tensor (3×4×23) having the feature values of software components (OSs, services, ports, and products) installed in all hosts in each topology, which is generated at step S123 described above. Here, the dimensionality of the global features may be calculated as shown in Equation (1) below:

dimensionality of global features=(maximum number of software components in each host)×(number of features of software components)×(maximum number of channels in each topology)=3×4× 23=276 (1)

FIG. 20 is an exemplary view of upper triangular topology matrix data according to an embodiment.

Referring to FIG. 20, a connectivity matrix (Connectivity_matrix) is read from the topology_matrix.pkl file, which contains host IP addresses and connectivity matrix data for each topology. The connectivity matrix represents the states of physical connection between hosts in a network topology, and is characterized by the symmetric matrix form thereof. In order to remove repeated data and reduce the dimensionality of data input to a learning model, only the upper triangular part of the connectivity matrix is taken, whereby upper triangular topology matrix learning data is formed. In the upper triangular topology matrix, an element value '1' represents that two hosts are physically connected with each other, and an element value '0' represents that two hosts are not connected with each other.

Figure 21:
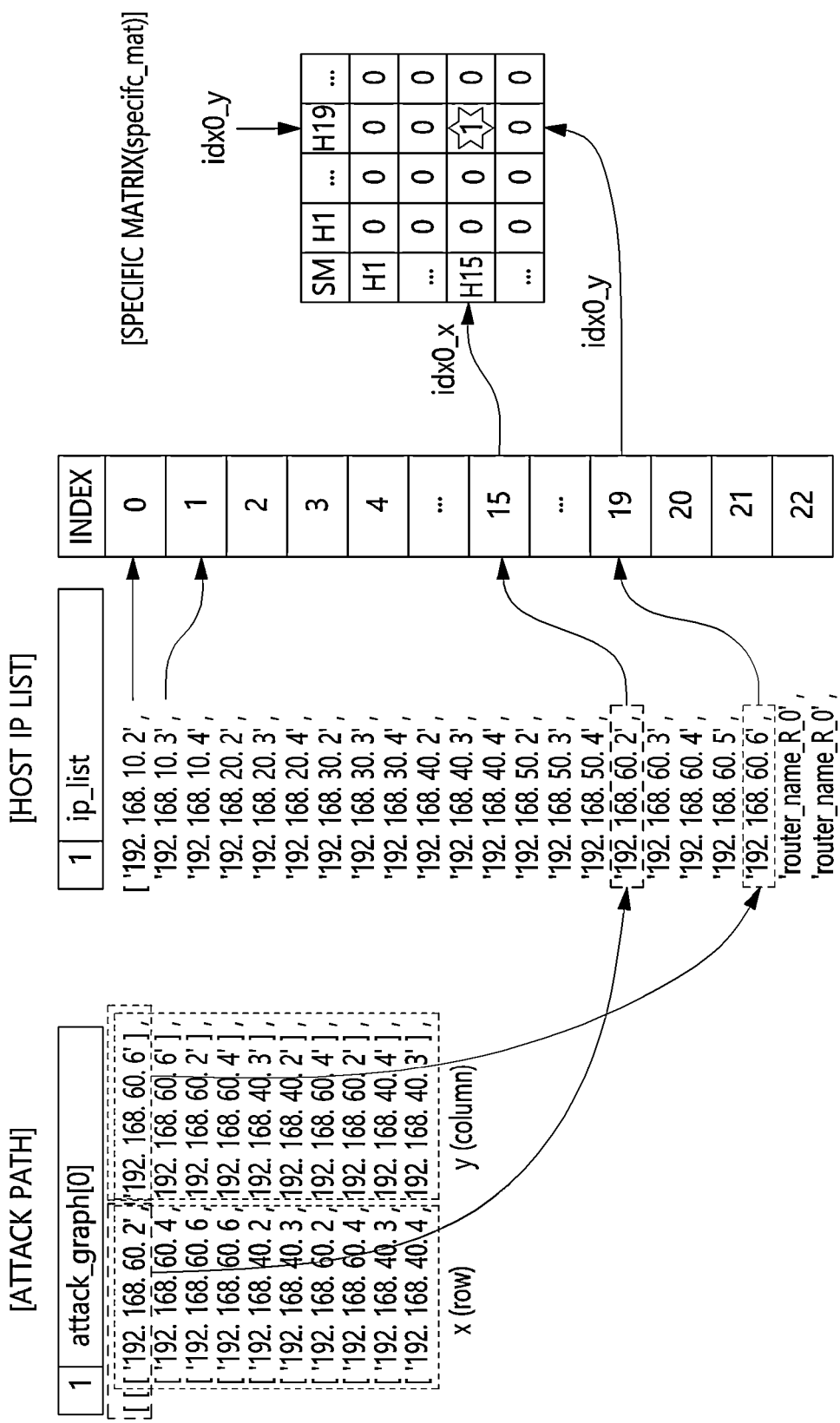
FIG. 21 is an exemplary view illustrating assignment of an attack path to a specific matrix according to an embodiment.

FIG. 21 is an exemplary view of the assignment of an attack path to a specific matrix according to an embodiment.

Referring to FIG. 21, attack path data configured with host IP addresses pertaining to each topology is read from the attack_graph.pkl file. In the present invention, the maximum length of an attack path is set to 3 in an embodiment, but the maximum length of an attack path may vary depending on the settings made at the step (S114) of generating a predictive attack path.

The specific matrix may be formed by assigning hosts included in a host IP list as the row indices and column indices thereof and setting each element thereof, which represents a pair of hosts of an attack path, to '1' or '0'. Here, the size of the specific matrix may be set based on the size of the host IP list of each topology.

For example, if the number of hosts included in the host IP list is m (=22), the specific matrix is formed an m×m square matrix, and the elements thereof are initialized to '0'. The first host IP address of an attack path corresponds to a row of the specific matrix, and the second host IP address thereof corresponds to a column thereof. The host IP list includes all host IP addresses pertaining to a topology, and host IP addresses in a number equal to the size of the list are sequentially indexed from 0.

That is, as shown in FIG. 21, the first host IP address ('192.168.60.2') in the first row of the attack path list corresponds to the index 15 of the host IP list, and the second host IP address ('192.168.60.6') therein corresponds to the index 19 of the host IP list. Accordingly, the element SM (15, 19) in the 15th row and the 19th column of the specific matrix is set to 1, which indicates that this pair of hosts corresponds to an attack path in the network topology.

Figure 22:
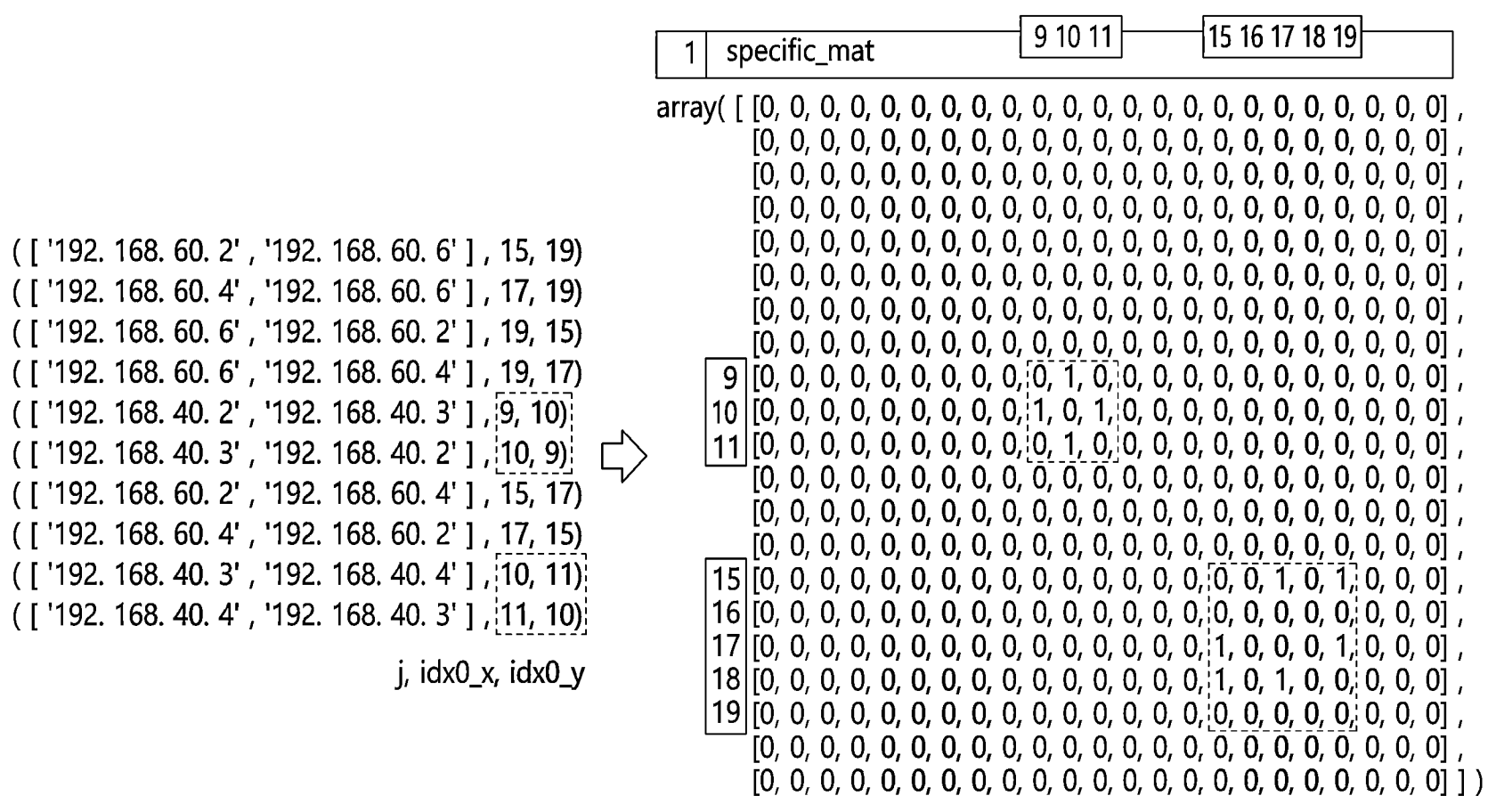

The above-described process is repeatedly performed for the remaining attack paths, whereby the attack paths may be represented as shown in FIG. 22. FIG. 22 is an exemplary view illustrating the result of assigning all attack paths to a specific matrix according to an embodiment.

Subsequently, only the upper triangular part of the specific matrix is selected in order to match the same with the form of the upper triangular topology matrix, whereby an upper triangular specific matrix is generated.

A specific feature represents the position of the attack path in the specific matrix as the index of the host IP list. That is, the index is assigned as shown below.
specific_feature [0]=idx0_x
specific_feature [1]=idx0_y
specific_feature [2]=22

Meanwhile, a negative attack path may be generated as follows.

The negative attack path indicates a path connecting hosts in a network topology, but is not included in a labeled attack path list.

FIG. 23 is an exemplary view of an upper triangular topology matrix according to an embodiment, and FIG. 24 is an exemplary view of a specific matrix according to an embodiment.

Referring to FIG. 23, an element value '1' in the upper triangular topology matrix indicates that physical connection between hosts is present. In an embodiment, only physical connection between hosts is considered, but logical connection of services between hosts may be considered in consideration of service connection policies, such as a firewall device, a host firewall, and the like.

Referring further to FIG. 24, illustrating the specific matrix representing attack paths, it can be seen that not all connections between hosts are attack paths. That is, when the value of an element in the upper triangular topology matrix is '1', the value of an element (the connection between hosts) at the same position in the specific matrix may be '1' (positive attack path) or '0' (negative attack path).

As described above, in the case of a negative attack path 51, the value of an element corresponding thereto in the upper triangular topology matrix is '1' but the value of an element at the same position in the specific matrix is '0'. However, in the case of a positive attack path 53, both the value of an element corresponding thereto in the upper triangular topology matrix and the value of an element at the same position in the specific matrix are '1'.

The indices indicating a pair of hosts (the row and the column of an element in an upper triangular topology matrix) corresponding to a negative attack path, which is represented as an element value of '1' in the upper triangular topology matrix and as an element value of '0' at the same position in the specific matrix, are acquired, whereby a negative attack path list is formed, and then as many negative attack paths as desired may be selected therefrom.

FIG. 25 is an exemplary view of a negative attack path list according to an embodiment.

Referring to FIG. 25, a list comprising 20 negative attack paths generated for each topology is illustrated.

After the negative attack path list is generated, the elements of a specific matrix are initialized to 0. A single pair of hosts is selected from the negative attack path list. For example, if the index of the selected pair of hosts is (idx0_x, idx0_y)=(10, 21), the element value at the corresponding position (the tenth row and the 21st column) in the specific matrix is set to 1. The index of the pair of hosts is assigned to a specific feature. Then, only the upper triangular part of the specific matrix is selected, whereby an upper triangular specific matrix including negative attack paths is generated.

This process is repeatedly performed a number of times equal to the number of random samples (e.g., 20) for each topology, and is applied to all of the topologies so as to generate two million pieces of negative attack path data.

FIG. 26 is an exemplary view of a matrix that shows the states of physical connection between hosts in a current topology according to an embodiment, and FIG. 27 is an exemplary view that shows positions corresponding to a negative attack path in a matrix according to an embodiment.

Referring to FIG. 26, the elements circled and denoted by reference numerals 54 and 55 represent pairs of hosts physically connected to each other, and may correspond to a positive attack path. However, referring further to FIG. 27, it can be seen that the element denoted by reference numeral 56 and located at the same position as the element denoted by reference numeral 55 in FIG. 26 represents a pair of hosts physically connected to each other, but corresponds to a negative attack path.

The process of generating a positive attack path is performed as follows.

Figures 30, 31:
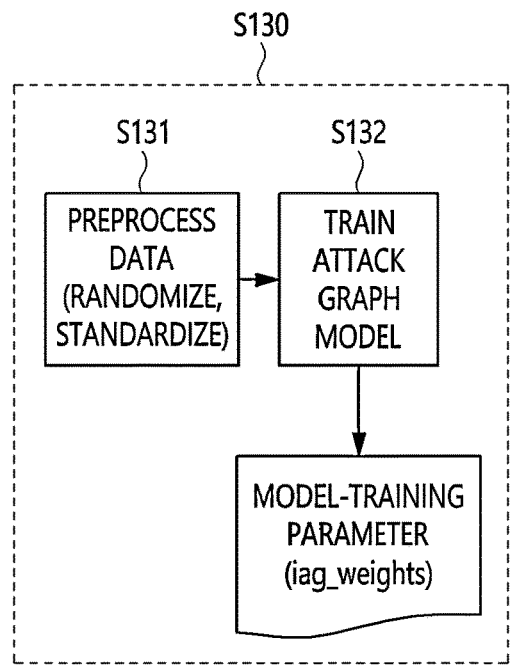
FIG. 30 is an exemplary view illustrating the position of a positive attack path represented in a matrix according to an embodiment.
FIG. 31 is a view for explaining the operation of an intelligent attack path prediction model training unit according to an embodiment.

FIG. 28 is an exemplary view of a positive attack path list according to an embodiment, FIG. 29 is an exemplary view of a matrix that shows the states of physical connection between hosts in a current topology according to an embodiment, and FIG. 30 is an exemplary view that shows positions corresponding to a positive attack path in a matrix according to an embodiment.

Referring to FIG. 28, the positive attack path list is provided for each topology by reading from the attack_graph.pkl file. A pair of hosts corresponding to each attack path is indexed by referring to a host IP list.

For example, as shown in FIG. 29, when the index of the selected pair of hosts is (idx0_x, idx0_y)=(15, 19), the element value at the corresponding position (the 15th row and the 19th column) in a specific matrix is set to 1. The index of the pair of hosts is assigned to a specific feature. Then, only the upper triangular part of the specific matrix is selected, whereby an upper triangular specific matrix including positive attack paths is generated.

This process is repeatedly performed ten times corresponding to the number of samples for each topology, and is applied to all of the topologies so as to generate one million pieces of positive attack path data.

When attack path data is configured, the upper triangular topology matrix is flattened so as to form a 253-dimensional vector, and is concatenated to global feature data. Flattening is performed in such a way that the last element of each row is followed by the first element of the subsequent row. Also, the upper triangular specific matrix is flattened so as to form a 253-dimensional vector, and is concatenated to specific feature data.

The one million pieces of positive attack path data and the two million pieces of negative attack path data generated through this process are respectively saved as the data_final_positive_v2.npy file and the data_final_negative_v2.npy file.

Table 8 is an exemplary view of attack path data.

FIG. 31 is a block diagram illustrating in detail an intelligent attack path prediction model training unit according to an embodiment.

Referring to FIG. 31, the training-processing unit 100 may perform preprocessing on attack path data to be input to a neural network model at step S131 and training of an attack graph model for training an intelligent attack path prediction model and validating performance at step S132.

The data-preprocessing step (S131) may include reading attack path data, data labeling, dividing data into training data and validation data, data standardization, and specific feature data assignment.

Here, at the step of reading the attack path data, one million pieces of positive attack path data (data_pos) and two million pieces of negative attack path data (data_neg) are read from the respective attack path data files (data_final_positive_v2.npy and data_final_negative_v2.npy) generated at the above-described attack data generation step (S124). Here, because the pieces of attack path data are sorted by topology, they are randomly mixed in units of samples (by changing the rows of the data) in order to remove dependence on topologies.

Figure 32:
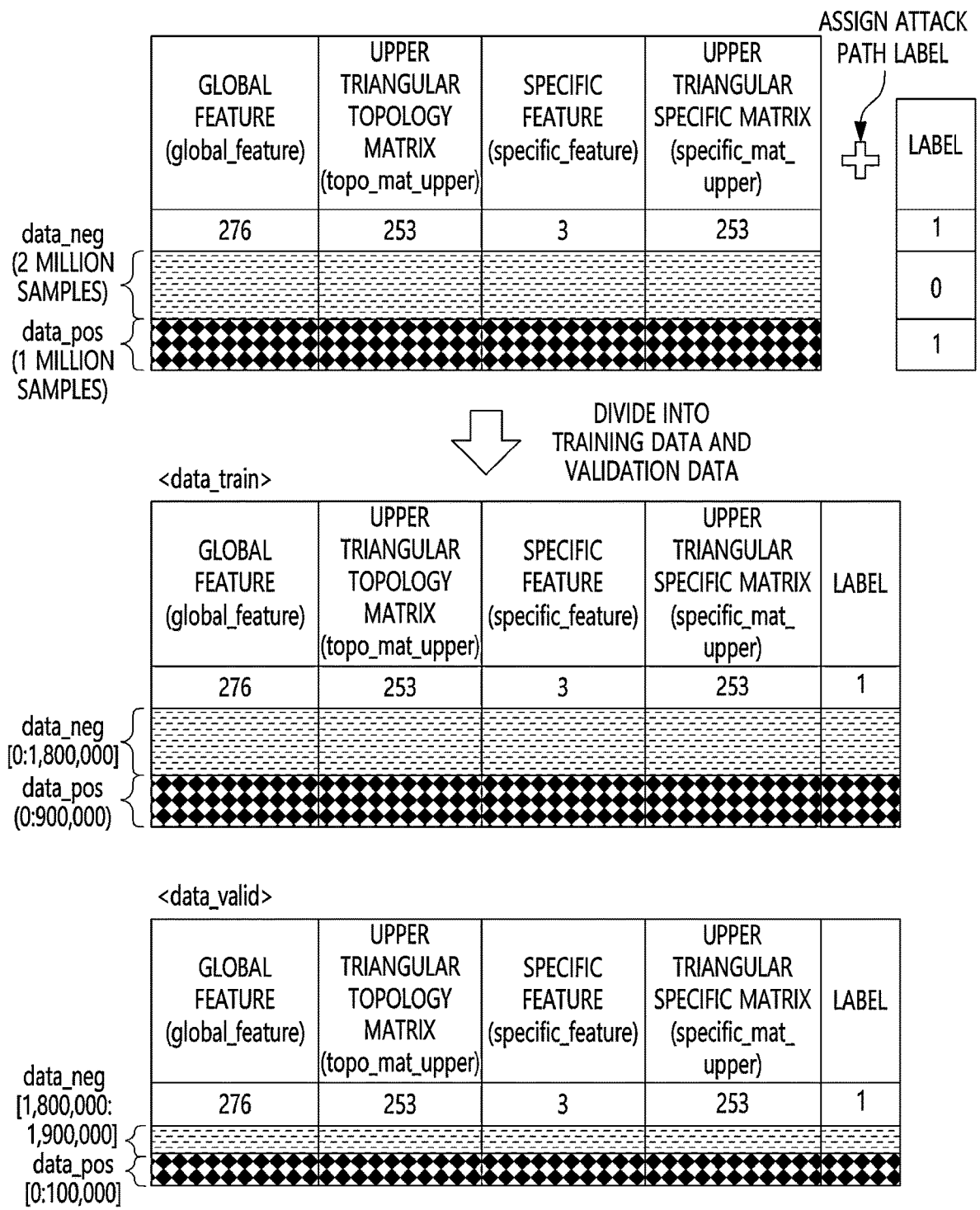
FIG. 32 is an exemplary view illustrating a step of labeling attack path data and separating training/validation data according to an embodiment.

FIG. 32 is an exemplary view of the step of labeling attack path data and dividing data into training/validation data according to an embodiment.

Referring to FIG. 32, at the data labeling step, a positive attack path is labeled with '1' and a negative attack path is labeled with '0'.

At the step of dividing data into training data and validation data, 90% of all attack paths are set as training data, and 10% thereof are set as validation data. In an embodiment, the 1.8 million top pieces of negative attack path data (data_neg [0:1,800,000]) are used as training data (data_train) and 100,000 pieces of remaining negative attack path data (data_neg [1,800,000:1,900,000]) are used as validation data (data_valid). Also, the 900,000 top pieces of positive attack path data (data_pos [0:900,000]) are used as training data and the remaining 100,000 pieces thereof (data_pos [900,000:1,000,000]) are used as validation data. Then, the samples of the divided data are randomly mixed again such that the attack path labels are mixed in units of samples.

At the data standardization step, the global feature data of the attack path data is standardized. The global feature data includes a result of encoding of software components (OSs, services, products, and ports) installed in all hosts in a topology. If these values are directly input to a neural network model, low training speed and convergence to a local minimum may be caused, so standardization is performed in order to prevent these.

Figure 33:
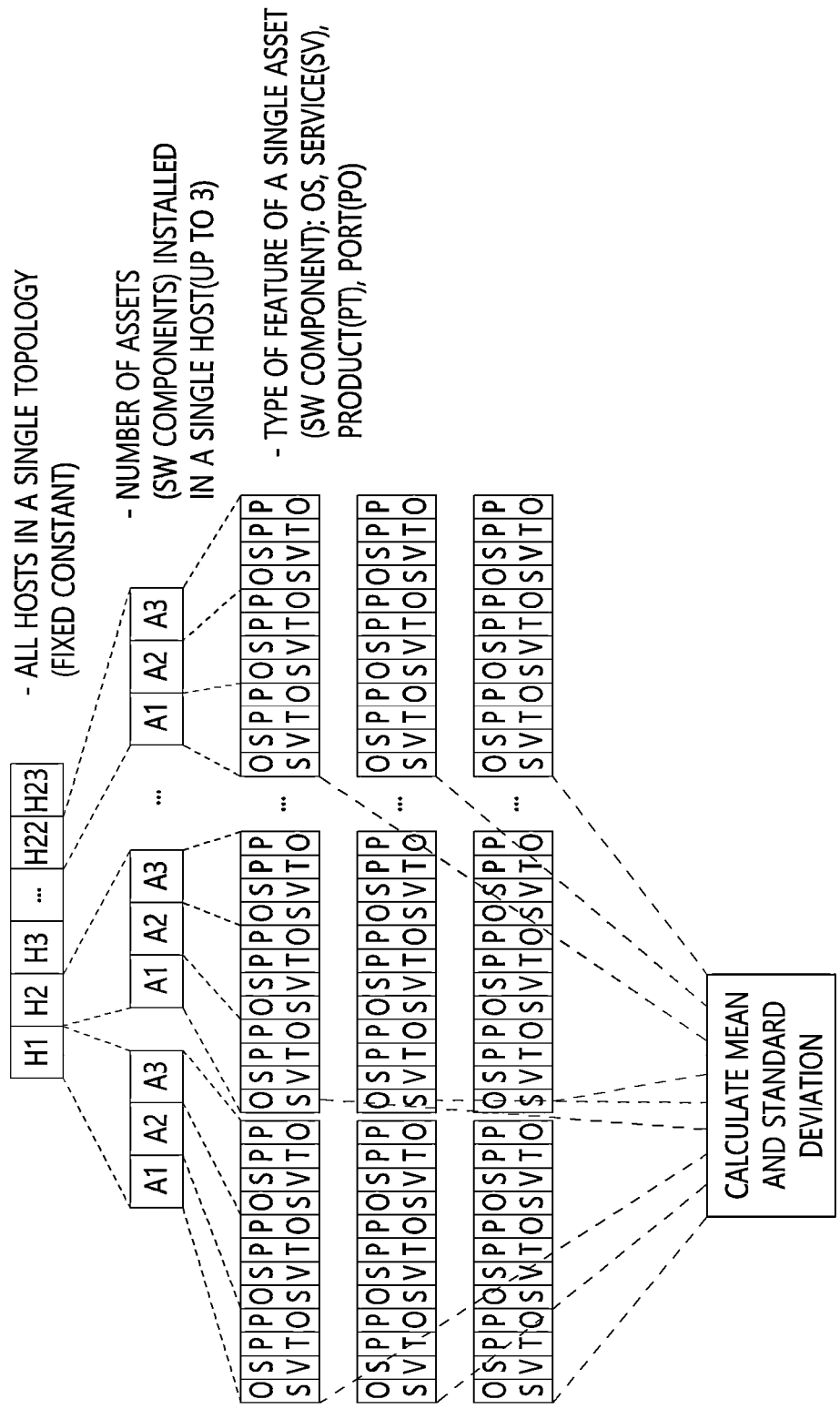
FIG. 33 is an exemplary view illustrating a step of standardizing global feature data according to an embodiment.

FIG. 33 is an exemplary view of the step of standardizing global feature data according to an embodiment.

TABLE 8

| | global feature (global_feature) | topology (topt_mat_upper) | specific feature (specific_feature) | upper triangular specific matrix (specific_mat_upper) |
|---|---|---|---|---|
| n = 1 | 276 | 253 | 3 | 253 |
| n = 2 | | | | |
| ... | | | | |

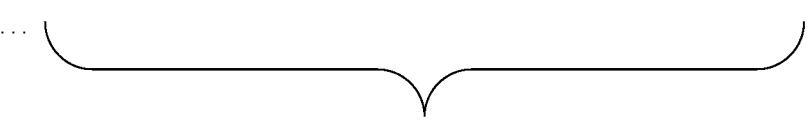

785

Referring to FIG. 33, a maximum of three software components are installed in each host, and each software component has four-dimensional feature data (an OS, a service, a product, and a port), so a single host has 12-dimensional feature data. Such 12-dimensional feature data is present in all of the hosts in each topology. The 12-dimensional feature data of hosts in all of the topologies is selected from the training data, and a mean and a standard deviation are calculated for each dimension. Then, the mean is subtracted from the value of the 12-dimensional feature data of the software components of each host, included in the global feature data of the entire training data, and the result of the subtraction is divided by the standard deviation, whereby the global feature data is standardized.

The specific feature data assignment step is a process for substituting a specific feature value, which represents an attack path in attack path data as a host index, with the global feature value of the corresponding host in the topology.

Figure 34:
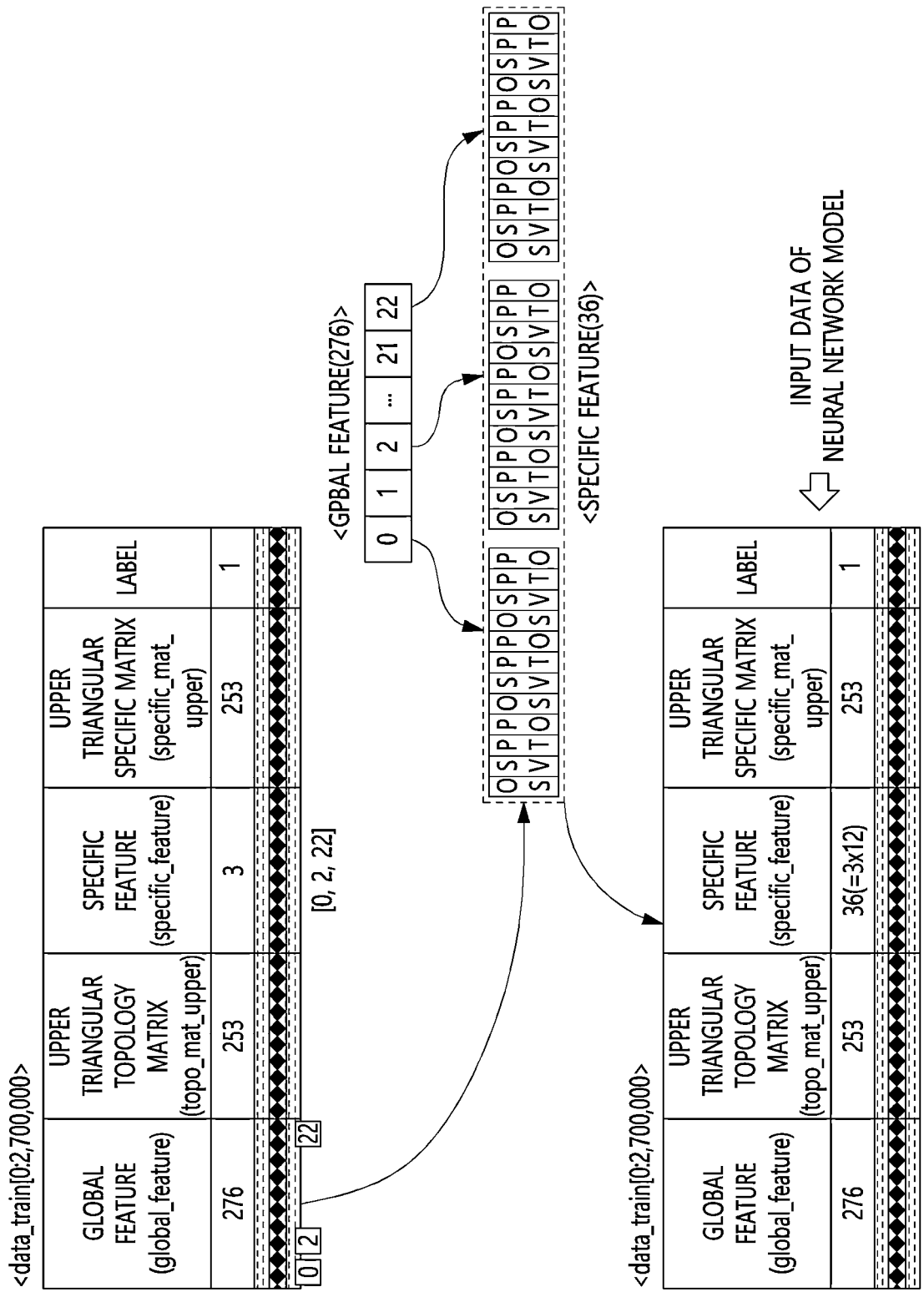
FIG. 34 is an exemplary view illustrating a step of substituting a specific feature field value according to an embodiment.

FIG. 34 is an exemplary view of the step of substituting a specific feature field value according to an embodiment.

Referring to FIG. 34, if the host index value of an attack path in a sample of training data is (idx0, idx1, idx2)=(0, 2, 22), 12 values corresponding to software component features of each of the zeroth, second, and 22nd hosts in the global feature data are taken and sequentially arranged to form 36 dimensions, and these substitute for the specific feature field. This process is repeatedly performed for all of the training data and validation data, and the resultant data is finally used as data input to the neural network.

Referring again to FIG. 31, the intelligent attack path prediction model is trained and the performance thereof is validated by receiving the training and validation data as input at the step (S132) of training an attack graph model. When training of the model is finished, the weight parameters of the model are saved as a file, whereby a model is able to load the weight parameters and use the same to predict an attack path when a new network topology and host asset information are given.

Here, in an embodiment, the intelligent attack path prediction model is a multi-path deep-learning model that separately uses global input and target-specific input based on TensorFlow v2.0.

Figure 35:
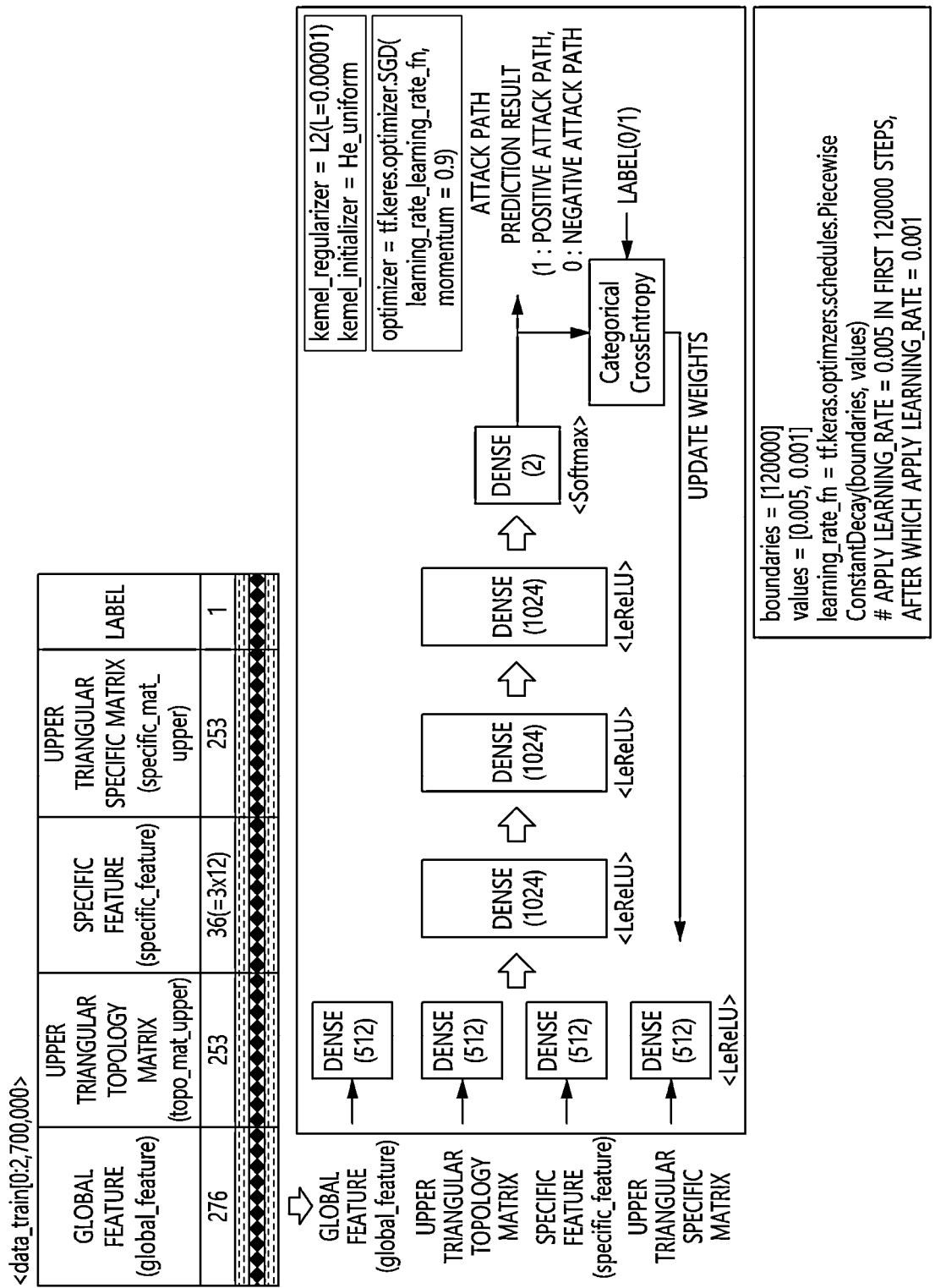
FIG. 35 is an exemplary view illustrating the structure of an intelligent attack path prediction model and hyperparameter settings according to an embodiment.

FIG. 35 is an exemplary view of the structure of an intelligent attack path prediction model and hyperparameter settings according to an embodiment.

Referring to FIG. 35, when it receives an entire topology and a path between specific hosts as input, a model determines whether the input path between the specific hosts is a positive attack path or a negative attack path.

Also, the intelligent attack path prediction model may include an input layer, three hidden layers, and an output layer.

Here, in order to respectively process the global feature data, the upper triangular topology matrix data, the specific feature data, and the upper triangular specific matrix data of the attack path data, the input layer is configured with four fully-connected (dense) layers, each having 512 dimensions. Leaky ReLU is used as the activation function of the input layer, and alpha=0.01 is set. The three hidden layers are configured with 1024-dimensional fully-connected layers, and Leaky ReLU is used as the activation function thereof, as in the input layer. The output layer is configured with a two-dimensional fully-connected layer, and SoftMax is used as the activation function thereof.

In order to initialize the weights of the model, He_uniform is used, and L2 model (L=0.00001) is used for a kernel regularizer function. A loss function uses a SparseCategoricalCrossEntropy function. The optimizer uses a SGD model in which momentum=0.9 is applied. The learning rate is set to 0.005 in first 120,000 steps, and after that, it is set to 0.001.

Training of the model is performed for 5 epochs by inputting 2,700,000 samples of training data (data_train) to the model after setting a batch size to 100. Whenever training using the training data is repeated 100 times, the performance of the model is measured using 200,000 samples of validation data (data_valid). In the performance measurement metric, a Mean Squared Error method is used to measure loss, and a SparseCategoricalCrossEntropy function is used to measure prediction accuracy.

Figure 36:
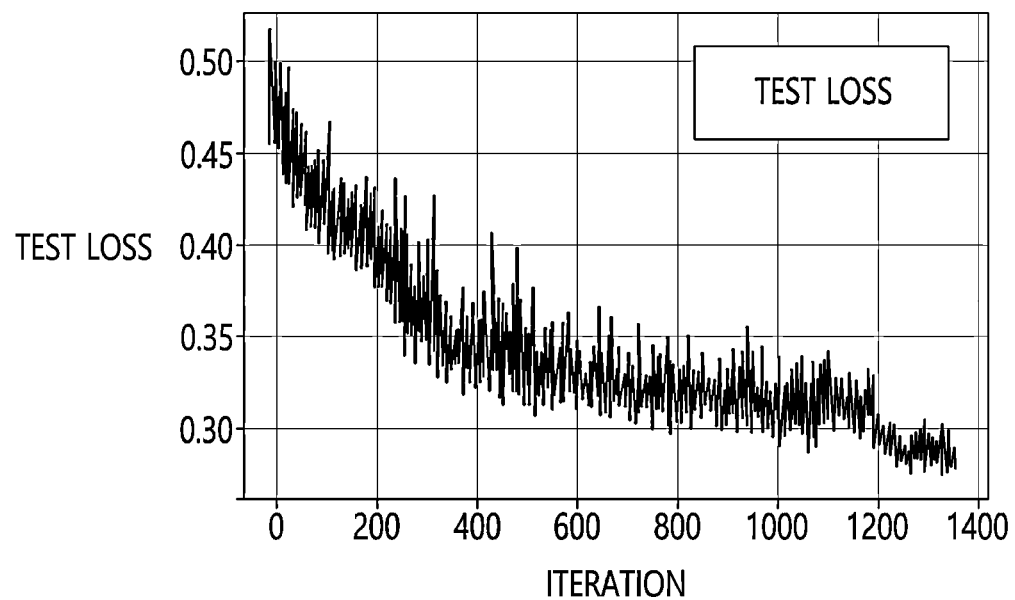
FIG. 36 is an exemplary graph representing loss as a model performance measurement result according to an embodiment.
Figure 37:
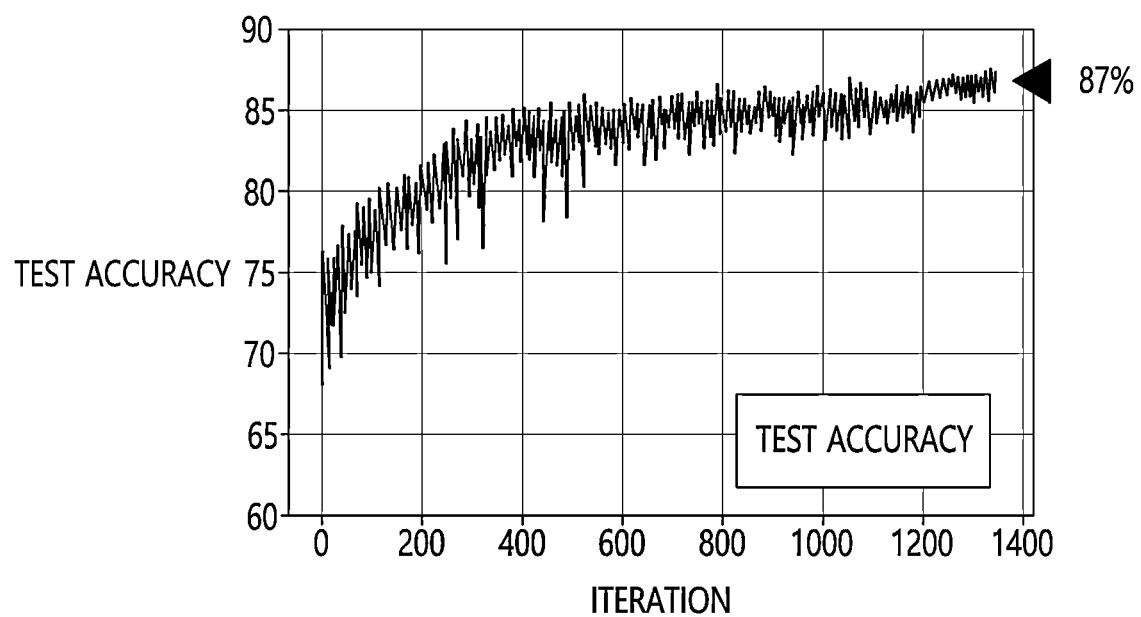
FIG. 37 is an exemplary graph representing accuracy as a model performance measurement result according to an embodiment.

FIG. 36 is an exemplary graph representing loss as a model performance measurement result according to an embodiment, and FIG. 37 is an exemplary graph representing accuracy as a model performance measurement result according to an embodiment.

After training by which loss converges to a minimum, as shown in FIG. 36, is finished, the final performance of a model reaches 87% of attack path prediction accuracy, as shown in FIG. 37.

Figure 38:
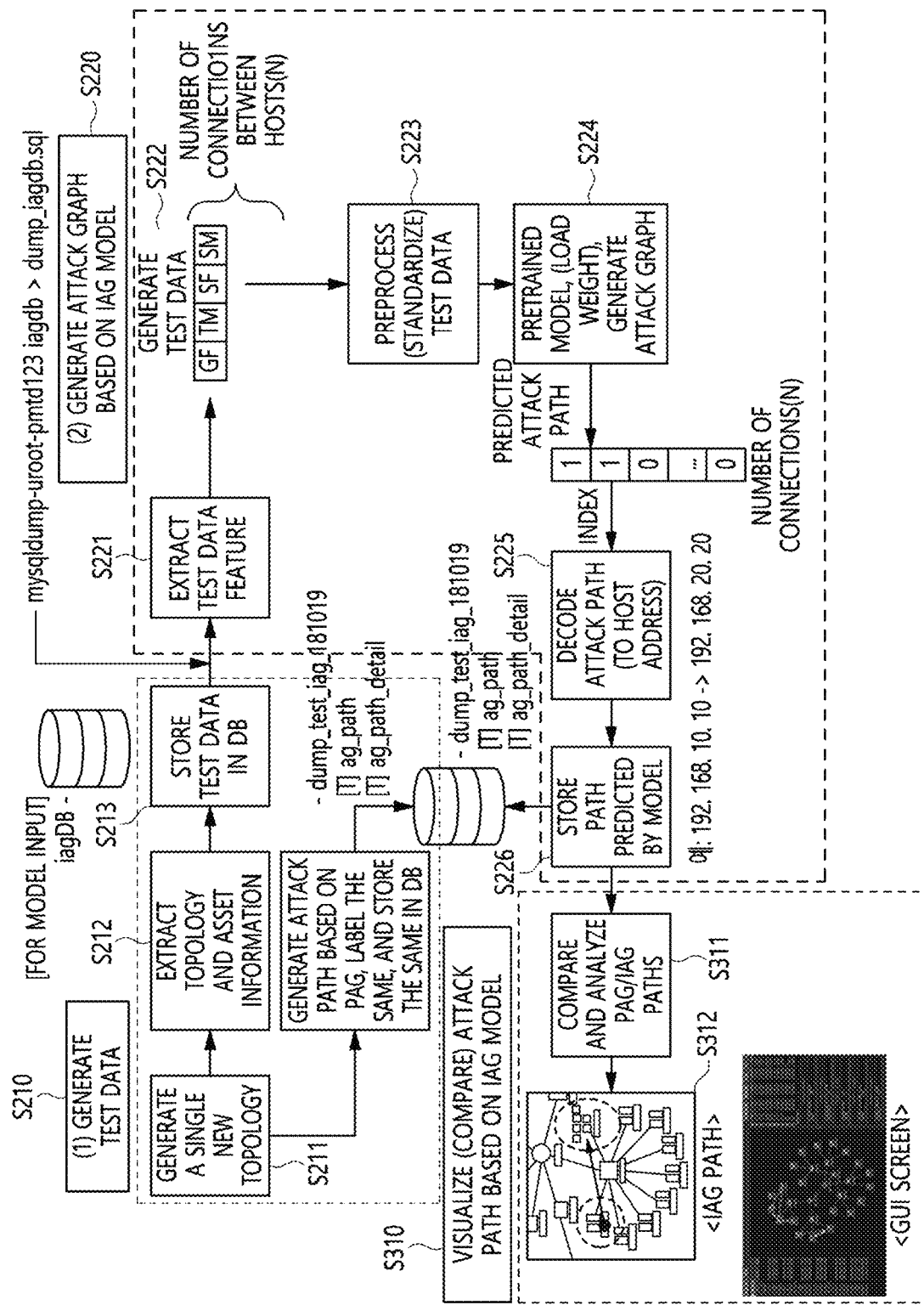
FIG. 38 is a view for explaining the operation of an intelligent attack path prediction unit according to an embodiment.

FIG. 38 is a view for explaining the operation of an intelligent attack path prediction unit according to an embodiment.

Referring to FIG. 38, the intelligent attack path prediction unit 200 may perform generating test data at step S210 and generating an attack graph based on an intelligent attack path prediction (IAG) model at step S220.

At the step (S210) of generating test data, test data required for generating an intelligent attack graph is generated.

That is, a new topology is generated at step S211 using a network simulator, and a network topology and asset information are extracted therefrom at step S212 and stored in a database iagDB at step S213. Meanwhile, in order to validate a result of prediction based on the intelligent attack graph, the attack graph is generated by applying the new topology to the predictive attack graph generation model, and is stored in a database pagDB at step S214.

At the step (S220) of generating an attack graph based on the intelligent attack path prediction model, global features are extracted from the test data at step S221. A number of pieces of test attack path data equal to the number of connections between hosts is generated at step S222. Subsequently, the test data is preprocessed (standardized) and input to the pretrained model at step S223. Accordingly, the IAG model predicts a number of attack paths equal to the number of pieces of attack path data, decodes the index of the attack path data, and generates attack paths represented as host IP addresses at step S225.

The user input/output unit 500 performs a function of visualizing and displaying the intelligent attack path prediction result generated using the intelligent attack path prediction method.

Figure 39:
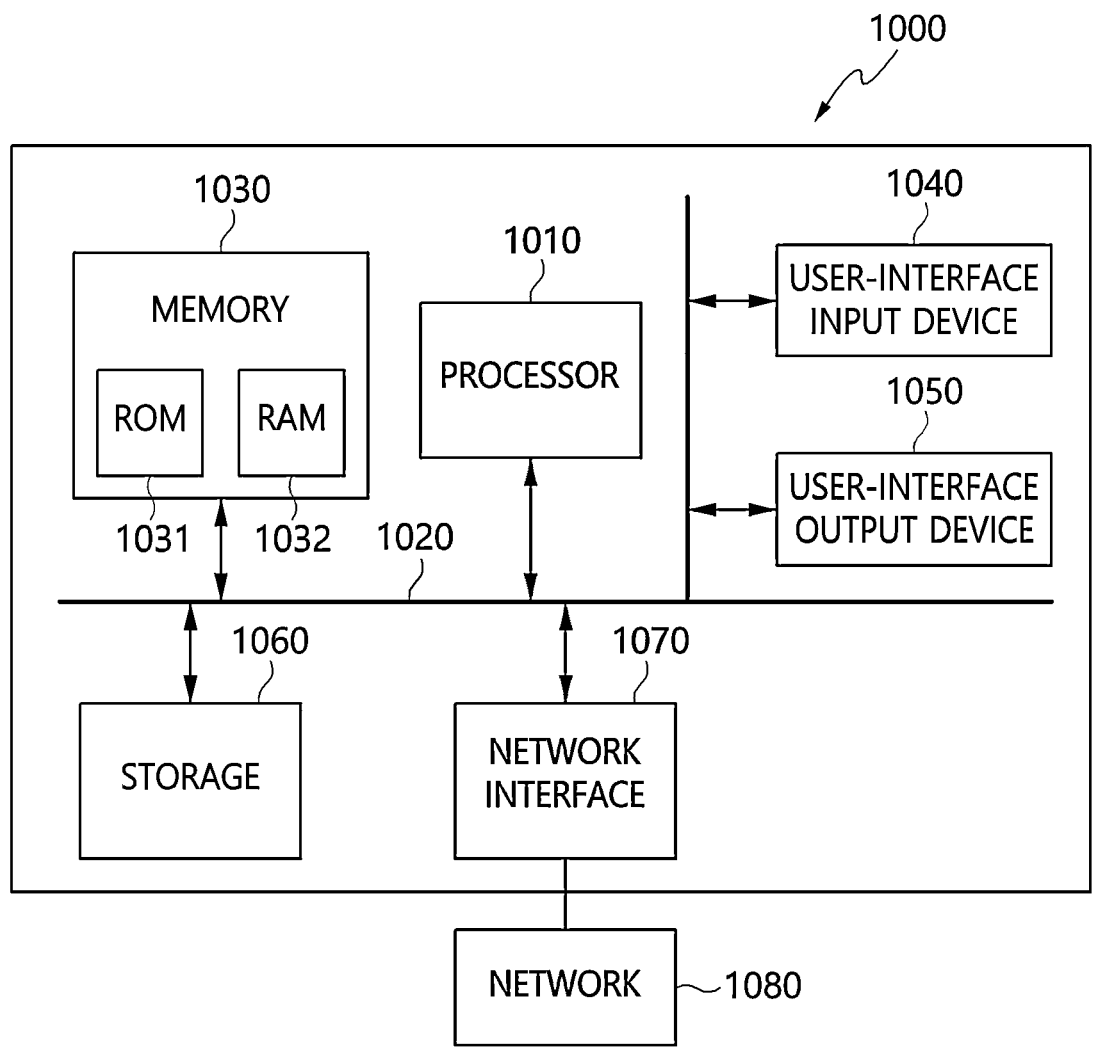
FIG. 39 is a view illustrating a computer system configuration according to an embodiment.

FIG. 39 is a view illustrating a computer system configuration according to an embodiment.

Each of the apparatus for inferring a cyberattack path based on attention, the training-processing unit, and the intelligent attack path prediction unit according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, a cyberattack surface of a network system may be predicted using a machine-learning method without additionally constructing a vulnerability DB.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for training an intelligent attack path prediction model, comprising:
    memory in which at least one program is recorded; and
    a processor for executing the program,
    wherein the program performs generating and collecting a virtual network topology and host asset information required for predicting cyberattack vulnerabilities in a computer network system;
    extracting at least one of global feature data and specific feature data from the collected network topology and host asset information; and
    training a neural network model for predicting attack vulnerabilities in the network system by using at least one of the extracted global feature data and specific feature data as training data,
    wherein the extracting at least one of the global feature data and the specific feature data includes
    reading a CVE (Common Vulnerabilities and Exposures) file, generated by reflecting a vulnerability level of a software component, and generating asset dictionaries for encoding intelligent attack graph learning data;
    extracting feature data required for model training from preconstructed intelligent attack graph learning data;
    generating global feature data for each topology to be used for model training; and
    generating positive attack path data and negative attack path data with which the intelligent attack path prediction model is to be trained,
    wherein the asset dictionaries include a service dictionary, a port dictionary, and a product dictionary, and
    wherein generating the global feature data for each topology to be used for model training includes
    forming a service vector, a port vector, and a product vector;
    forming N channels corresponding to a number of hosts;
    assigning a service, a port, and a product, among software components, read from a service list to dimensions of respective vectors;
    concatenating an OS (Operating System), service, product, and port vectors in an order in which the OS (Operating System), service, product, and port vectors are listed so as to form a matrix for each host; and
    concatenating the N channels so as to form a tensor.

2. The apparatus of claim 1, wherein generating and collecting the virtual network topology and the host asset information includes
    generating the virtual network topology and the asset information required for predicting the cyberattack vulnerabilities in the computer network system;
    generating an edge between hosts in order to generate an attack graph, calculating a vulnerability score of each of the hosts, and storing the vulnerability score in an attack graph database;
    generating a connectivity matrix for representing a state of connection between the hosts in the network topology;
    generating an attack path using a function of generating a possible attack path using vulnerabilities based on a result of identification of assailable vulnerabilities and components, which are identified by receiving all possible paths between two hosts in the network; and
    constructing an intelligent-attack-graph learning database for training an attack vulnerability inference neural network model.

3. The apparatus of claim 2, wherein generating the virtual network topology and the asset information performs at least one of
    generating a network assets dictionary including a timestamp field for identifying a dictionary creation time, a system_states field for storing system state information of a network host, and a topology field for storing topology information of the network system;
    generating a graph object for generating a mock topology using a graph tool;
    randomly selecting a number of subnets within a range between predefined maximum and minimum numbers of subnets and assigning a router node to a graph;
    updating the network assets dictionary with router information;
    updating the network assets dictionary with subnet information;
    updating the network assets dictionary with router-to-router link information and host-to-router link information; and
    reading a CVE file, containing information about vulnerabilities in selected OSs and services, and assigning an OS and a service to each host in the topology by selecting the OS and the service.

4. The apparatus of claim 1, wherein extracting the feature data comprises
    extracting host IP addresses, host connection information, host asset information, and a labeled attack path pertaining to a network for each network topology by referring to a topology table, a service table, and an attack path table of an intelligent-attack-graph learning database.

5. The apparatus of claim 1, wherein the attack path data is configured with global feature data, upper triangular topology matrix data, specific feature data, and upper triangular specific matrix data.

6. The apparatus of claim 5, wherein generating the positive attack path data and the negative attack path data comprises
    forming a negative attack path list by retrieving an index of a pair of hosts corresponding to a negative attack path, which is represented as an element value '1' in an upper triangular topology matrix and an element value '0' at a same position in a specific matrix.

7. The apparatus of claim 1, wherein:
training the neural network model includes preprocessing the training data, and
preprocessing the training data includes
reading a predetermined number of pieces of positive attack path data and negative attack path data from a generated attack path data file;
labeling a positive attack path and a negative attack path with different values;
dividing all attack paths into training data and validation data;
standardizing global feature data of the attack path data; and
substituting a specific feature value, which represents an attack path in the attack path data as a host index, with a global feature value of a corresponding host in the topology.

8. The apparatus of claim 7, wherein the neural network model includes
an input layer configured with four fully-connected (dense) layers, each having 512 dimensions, so as to respectively process global feature data, upper triangular topology matrix data, specific feature data, and upper triangular specific matrix data in the attack path data;
a hidden layer configured with a 1024-dimensional fully-connected layer; and
an output layer configured with a two-dimensional fully-connected layer.

9. An apparatus for inferring a cyberattack path based on attention, comprising:
memory in which at least one program is recorded; and
a processor for executing the program,
wherein the program performs
generating test data required for generating an intelligent attack graph; and
generating an attack graph based on an intelligent attack path prediction model,
wherein the intelligent attack path prediction model is a neural network model pretrained for predicting attack vulnerabilities in a network system by using at least one of extracted global feature data and specific feature data as training data from a collected virtual network topology and host asset information,
wherein the program performs extracting at least one of the global feature data and the specific feature data,
wherein the extracting at least one of the global feature data and the specific feature data includes
reading a CVE (Common Vulnerabilities and Exposures) file, generated by reflecting a vulnerability level of a software component, and generating asset dictionaries for encoding intelligent attack graph learning data;
extracting feature data required for model training from preconstructed intelligent attack graph learning data;
generating global feature data for each topology to be used for model training; and
generating positive attack path data and negative attack path data with which the intelligent attack path prediction model is to be trained,
wherein the asset dictionaries include a service dictionary, a port dictionary, and a product dictionary, and
wherein generating the global feature data for each topology to be used for model training includes
forming a service vector, a port vector, and a product vector;
forming N channels corresponding to a number of hosts;
assigning a service, a port, and a product, among software components, read from a service list to dimensions of respective vectors;
concatenating an OS (Operating System), service, product, and port vectors in an order in which the OS (Operating System), service, product, and port vectors are listed so as to form a matrix for each host; and
concatenating the N channels so as to form a tensor.

10. The apparatus of claim 9, wherein generating the test data includes
generating a new topology using a network simulator;
extracting a network topology and asset information and storing the network topology and the asset information in a database; and
generating an attack graph by applying the new topology to a predictive attack graph generation model and storing the attack graph in a database.

11. The apparatus of claim 9, wherein generating the attack graph based on the intelligent attack path prediction model includes
extracting global features from the test data; and
generating a number of pieces of test attack path data equal to a number of connections between hosts.

12. A method for training an intelligent attack path prediction model, comprising:
generating and collecting a virtual network topology and host asset information required for predicting cyberattack vulnerabilities in a computer network system;
extracting at least one of global feature data and specific feature data from the collected network topology and host asset information; and
training a neural network model for predicting attack vulnerabilities in the network system by using at least one of the extracted global feature data and specific feature data as training data,
wherein the extracting at least one of the global feature data and the specific feature data includes
reading a CVE (Common Vulnerabilities and Exposures) file, generated by reflecting a vulnerability level of a software component, and generating asset dictionaries for encoding intelligent attack graph learning data;
extracting feature data required for model training from preconstructed intelligent attack graph learning data;
generating global feature data for each topology to be used for model training; and
generating positive attack path data and negative attack path data with which the intelligent attack path prediction model is to be trained,
wherein the asset dictionaries include a service dictionary, a port dictionary, and a product dictionary, and
wherein generating the global feature data for each topology to be used for model training includes
forming a service vector, a port vector, and a product vector;
forming N channels corresponding to a number of hosts;
assigning a service, a port, and a product, among software components, read from a service list to dimensions of respective vectors;
concatenating an OS (Operating System), service, product, and port vectors in an order in which the OS (Operating System), service, product, and port vectors are listed so as to form a matrix for each host; and
concatenating the N channels so as to form a tensor.

13. The method of claim 12, wherein generating and collecting the virtual network topology and the host asset information includes generating the virtual network topology and the asset information required for predicting the cyberattack vulnerabilities in the computer network system;

generating an edge between hosts in order to generate an attack graph, calculating a vulnerability score of each of the hosts, and storing the vulnerability score in an attack graph database;

generating a connectivity matrix for representing a state of connection between the hosts in the network topology;

generating an attack path using a function of generating a possible attack path using vulnerabilities based on a result of identification of assailable vulnerabilities and components, which are identified by receiving all possible paths between two hosts in the network; and constructing an intelligent-attack-graph learning database for training an attack vulnerability inference neural network model.

14. The method of claim 13, wherein generating the virtual network topology and the asset information performs at least one of generating a network assets dictionary including a timestamp field for identifying a dictionary creation time, a system_states field for storing system state information of a network host, and a topology field for storing topology information of the network system;

generating a graph object for generating a mock topology using a graph tool;

randomly selecting a number of subnets within a range between predefined maximum and minimum numbers of subnets and assigning a router node to a graph;

updating the network assets dictionary with router information;

updating the network assets dictionary with subnet information;

updating the network assets dictionary with router-to-router link information and host-to-router link information; and reading a CVE file, containing information about vulnerabilities in selected OSs and services, and assigning an OS and a service to each host in the topology by selecting the OS and the service.

15. The method of claim 12, wherein the attack path data is configured with global feature data, upper triangular topology matrix data, specific feature data, and upper triangular specific matrix data.

16. The method of claim 15, wherein generating the positive attack path data and the negative attack path data comprises forming a negative attack path list by retrieving an index of a pair of hosts corresponding to a negative attack path, which is represented as an element value '1' in an upper triangular topology matrix and an element value '0' at a same position in a specific matrix.

17. The method of claim 12, wherein:

training the neural network model includes preprocessing the training data, and preprocessing the training data includes reading a predetermined number of pieces of positive attack path data and negative attack path data from a generated attack path data file;

labeling a positive attack path and a negative attack path with different values;

dividing all attack paths into training data and validation data;

standardizing global feature data of the attack path data; and substituting a specific feature value, which represents an attack path in the attack path data as a host index, with a global feature value of a corresponding host in the topology.

18. The method of claim 17, wherein the neural network model includes an input layer configured with four fully-connected layers, each having 512 dimensions, so as to respectively process global feature data, upper triangular topology matrix data, specific feature data, and upper triangular specific matrix data in the attack path data;

a hidden layer configured with a 1024-dimensional fully-connected layer; and an output layer configured with a two-dimensional fully-connected layer.

* * * * *